US010104635B2

(12) United States Patent
Malik et al.

(10) Patent No.: US 10,104,635 B2
(45) Date of Patent: Oct. 16, 2018

(54) UNICAST AND BROADCAST PROTOCOL FOR WIRELESS LOCAL AREA NETWORK RANGING AND DIRECTION FINDING

(71) Applicant: QUALCOMM Incorporated, San Diego, CA (US)

(72) Inventors: Rahul Malik, San Diego, CA (US); Ravi Hiranand Gidvani, Fremont, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/257,824

(22) Filed: Sep. 6, 2016

(65) Prior Publication Data
US 2017/0251449 A1    Aug. 31, 2017

Related U.S. Application Data

(60) Provisional application No. 62/300,884, filed on Feb. 28, 2016.

(51) Int. Cl.
*H04H 20/71* (2008.01)
*H04W 64/00* (2009.01)
(Continued)

(52) U.S. Cl.
CPC ..... *H04W 64/003* (2013.01); *H04W 56/0065* (2013.01); *H04L 27/2602* (2013.01); *H04W 4/06* (2013.01); *H04W 84/12* (2013.01)

(58) Field of Classification Search
None
See application file for complete search history.

(56) References Cited

U.S. PATENT DOCUMENTS 9,634,811 B2    4/2017 Gong et al.
2006/0248429 A1   11/2006 Grandhi et al.
(Continued)

FOREIGN PATENT DOCUMENTS

WO    WO-2015130712 A1    9/2015

OTHER PUBLICATIONS

International Search Report and Written Opinion—PCT/US2017/015160—ISA/EPO—dated Apr. 6, 2017.
(Continued)

*Primary Examiner* — Phirin Sam
(74) *Attorney, Agent, or Firm* — Thien T Nguyen

(57) ABSTRACT

Disclosed embodiments pertain to a first STA may broadcast a first Null Data Packet Announcement (NDPA) frame with an indication of one or more second STAs being polled. Subsequent to the first NDPA frame, a Null Data Packet (NDP) frame may be broadcast from a plurality of antennas on the first STA and one or more corresponding first Fine Timing Measurement (FTM) frames may be received in response. Each corresponding first FTM frame may be received from a distinct corresponding second STA and may comprise corresponding ranging measurements between the first STA and the corresponding second STA as determined by the corresponding second STA based on the NDP frame. In some embodiments, the one or more corresponding first FTM frames may be: received in response to a previously broadcast trigger frame, and encoded using Orthogonal Frequency Division Multiple Access. The trigger frame may be broadcast subsequent to the NDP frame.

30 Claims, 12 Drawing Sheets

(51) Int. Cl.
*H04W 56/00* (2009.01)
*H04W 4/06* (2009.01)
*H04W 84/12* (2009.01)
*H04L 27/26* (2006.01)

(56) References Cited

U.S. PATENT DOCUMENTS

| | | |
|---|---|---|
| 2010/0271992 A1 | 10/2010 | Wentink et al. |
| 2011/0069668 A1 | 3/2011 | Chion et al. |
| 2011/0075607 A1 | 3/2011 | Kim et al. |
| 2012/0026909 A1 | 2/2012 | Seok |
| 2013/0188567 A1 | 7/2013 | Wang et al. |
| 2014/0056205 A1 | 2/2014 | Aboul-Magd et al. |
| 2014/0211703 A1* | 7/2014 | Seok ............ H04W 52/367 370/329 |
| 2014/0301240 A1 | 10/2014 | Park et al. |
| 2014/0301248 A1 | 10/2014 | Lindholm et al. |
| 2014/0334420 A1 | 11/2014 | You et al. |
| 2015/0043538 A1 | 2/2015 | Xu et al. |
| 2015/0063128 A1* | 3/2015 | Garikipati ............ H04B 7/0417 370/252 |
| 2015/0094103 A1 | 4/2015 | Wang et al. |
| 2015/0156794 A1 | 6/2015 | Kwon et al. |
| 2015/0326409 A1 | 11/2015 | Kim et al. |
| 2015/0365805 A1 | 12/2015 | Bajko et al. |
| 2016/0119902 A1 | 4/2016 | Cheong et al. |
| 2016/0134342 A1 | 5/2016 | Kneckt et al. |
| 2016/0143026 A1 | 5/2016 | Seok |
| 2016/0165607 A1* | 6/2016 | Hedayat ............ H04W 72/0453 370/338 |
| 2016/0205501 A1 | 7/2016 | Lee et al. |
| 2016/0233932 A1 | 8/2016 | Hedayat et al. |
| 2016/0330732 A1* | 11/2016 | Moon ............ H04B 7/0617 |
| 2016/0366548 A1* | 12/2016 | Wang ............ H04W 64/00 |
| 2017/0085306 A1 | 3/2017 | Cariou et al. |
| 2017/0171766 A1* | 6/2017 | Amizur ............ H04W 24/08 |
| 2017/0195026 A1* | 7/2017 | Ghosh ............ H04B 7/0617 |
| 2017/0223665 A1 | 8/2017 | Chun et al. |
| 2017/0250831 A1 | 8/2017 | Aldana et al. |
| 2017/0251332 A1 | 8/2017 | Aldana et al. |
| 2017/0339643 A1* | 11/2017 | Yang ............ H04W 52/0229 |
| 2018/0138959 A1* | 5/2018 | Chun ............ H04B 7/0626 |
| 2018/0176918 A1* | 6/2018 | Hedayat ............ H04W 72/0453 |
| 2018/0184421 A1* | 6/2018 | Seok ............ H04W 72/0413 |
| 2018/0212738 A1* | 7/2018 | Chun ............ H04L 1/16 |
| 2018/0213424 A1* | 7/2018 | Du ............ H04W 24/00 |

OTHER PUBLICATIONS

Yu H., et al., "Beamforming Transmission in IEEE 802.11ac Under Time-Varying Channels," The Scientific World Journal, Jul. 24, 2014, pp. 11.

* cited by examiner

| 502 | 504 | 506 | 508 | 510 | 512 |
|---|---|---|---|---|---|
| Category | Public Action | Dialog Token | Follow Up Dialog Token | TOD | TOA |

Octets: 1, 1, 1, 1, 6, 6

| 514 | 516 | 518 | 520 | 522 | 524 | 526 |
|---|---|---|---|---|---|---|
| TOD Error | TOA Error | FTM Synchronization Information (optional) | LCI Report (optional) | Location Civic Report (optional) | Fine Timing Measurement Parameters (optional) | AoA and/or AoD (optional) |

Octets: 2, 2, variable, variable, variable, variable

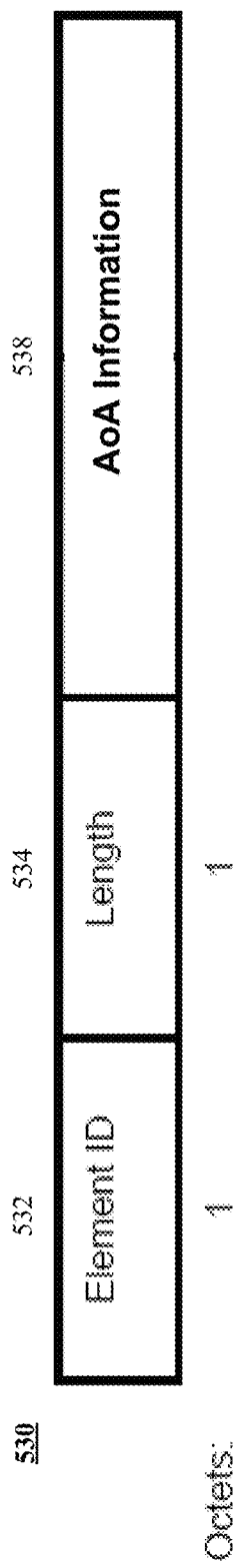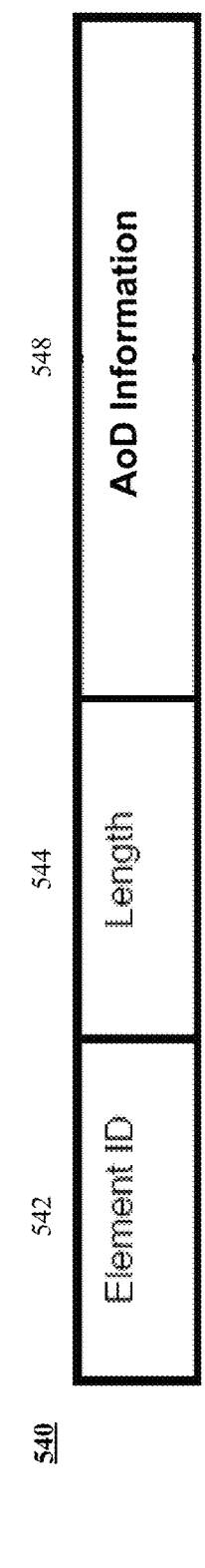
FIG. 5B
FIG. 5C

UNICAST AND BROADCAST PROTOCOL FOR WIRELESS LOCAL AREA NETWORK RANGING AND DIRECTION FINDING

CROSS REFERENCE TO RELATED APPLICATIONS

This application claims the benefit of and priority to U.S. Provisional Patent Application No. 62/300,884 entitled "Unicast and Broadcast Protocol for Wireless Local Area Network Ranging and Direction Finding," filed Feb. 28, 2016, which is assigned to the assignee hereof and incorporated by reference in its entirety herein.

FIELD

The subject matter disclosed herein relates to wireless communication and specifically to unicast, multicast, and/or broadcast protocols for sounding, ranging and/or direction finding in wireless communication systems.

BACKGROUND

It is often desirable to perform positioning functions on user equipment (UE) such as a mobile terminal, laptop, wearable, tablet, a cellular phone or other mobile device. The terms "location" and "position" are synonymous and are used interchangeably herein. For example, in wireless systems based on the IEEE 802.11 standard, positioning may be performed using Round Trip Time (RTT) measurements between an Access Point (AP) and User Equipment (UE).

In modern wireless systems, multiple antennas at the transmitter and receiver may be used to implement multiple input/multiple output (MIMO). MIMO facilitates parallel delivery of multiple spatially multiplexed data signals, which are referred to as multiple spatial streams. In addition, "beamforming" may be used for directional signal transmission or reception. In beamforming, elements in a phased array antenna are combined so that signals at some angles experience constructive interference, while others experience destructive interference, so that the beam may be "steered" in a desired direction. Beamforming can be used to achieve spatial selectivity at the transmitting and receiving ends. Techniques to facilitate beamforming calibration may therefore provide improved UE location determination and/or channel characterization.

SUMMARY

In some embodiments, a method on a first station (STA) may comprise: broadcasting a first Null Data Packet Announcement (NDPA) frame, the first NDPA frame comprising an indication of one or more second STAs being polled; broadcasting, subsequent to the first NDPA frame, a Null Data Packet (NDP) frame from a plurality of antennas on the first STA; and receiving, from the one or more second STAs, in response to the NDP frame, one or more corresponding first Fine Timing Measurement (FTM) frames. Each corresponding first FTM frame may: be received from a distinct corresponding second STA of the one or more second STAs; and, comprise corresponding first ranging measurements between the first STA and the corresponding second STA as determined by the corresponding second STA based, in part, on the NDP frame.

In another aspect, a first STA may comprise: a processor coupled to a memory and a plurality of antennas, wherein the processor is configured to: broadcast a first Null Data Packet Announcement (NDPA) frame, the first NDPA frame comprising an indication of one or more second STAs being polled; broadcast, subsequent to the first NDPA frame, a Null Data Packet (NDP) frame from the plurality of antennas; and receive, from the one or more second STAs, in response to the NDP frame, one or more corresponding first Fine Timing Measurement (FTM) frames. Each corresponding first FTM frame may: be received from a distinct corresponding second STA of the one or more second STAs; and, comprise corresponding first ranging measurements between the first STA and the corresponding second STA as determined by the corresponding second STA based, in part, on the NDP frame.

In a further aspect, a first station (STA) may comprise: means for broadcasting a first Null Data Packet Announcement (NDPA) frame, the first NDPA frame comprising an indication of one or more second STAs being polled; means for broadcasting, subsequent to the first NDPA frame, a Null Data Packet (NDP) frame from a plurality of antennas on the first STA; means for receiving, from the one or more second STAs, in response to the NDP frame, one or more corresponding first Fine Timing Measurement (FTM) frames. Each corresponding first FTM frame may: be received from a distinct corresponding second STA of the one or more second STAs; and, comprise corresponding first ranging measurements between the first STA and the corresponding second STA as determined by the corresponding second STA based, in part, on the NDP frame.

In some embodiments, a non-transitory computer-readable medium may comprise executable instructions to configure a processor to: broadcast a first Null Data Packet Announcement (NDPA) frame, the first NDPA frame comprising an indication of one or more second STAs being polled; broadcast, subsequent to the first NDPA frame, a Null Data Packet (NDP) frame from the plurality of antennas; and receive, from the one or more second STAs, in response to the NDP frame, one or more corresponding first Fine Timing Measurement (FTM) frames. Each corresponding first FTM frame may: be received from a distinct corresponding second STA of the one or more second STAs; and, comprise corresponding first ranging measurements between the first STA and the corresponding second STA as determined by the corresponding second STA based, in part, on the NDP frame.

The methods disclosed may be performed by one or more of APs, non-AP STAs, UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

FIG. 5A shows an example Fine Timing Measurement (FTM) frame 500, which may include AoA, AoD, and/or other information in accordance with certain embodiments presented herein.

FIGS. 5B and 5C show the formats of example AoA field 530 and AoD field 540, respectively, in accordance with certain embodiments presented herein.

DETAILED DESCRIPTION

Figure 1:
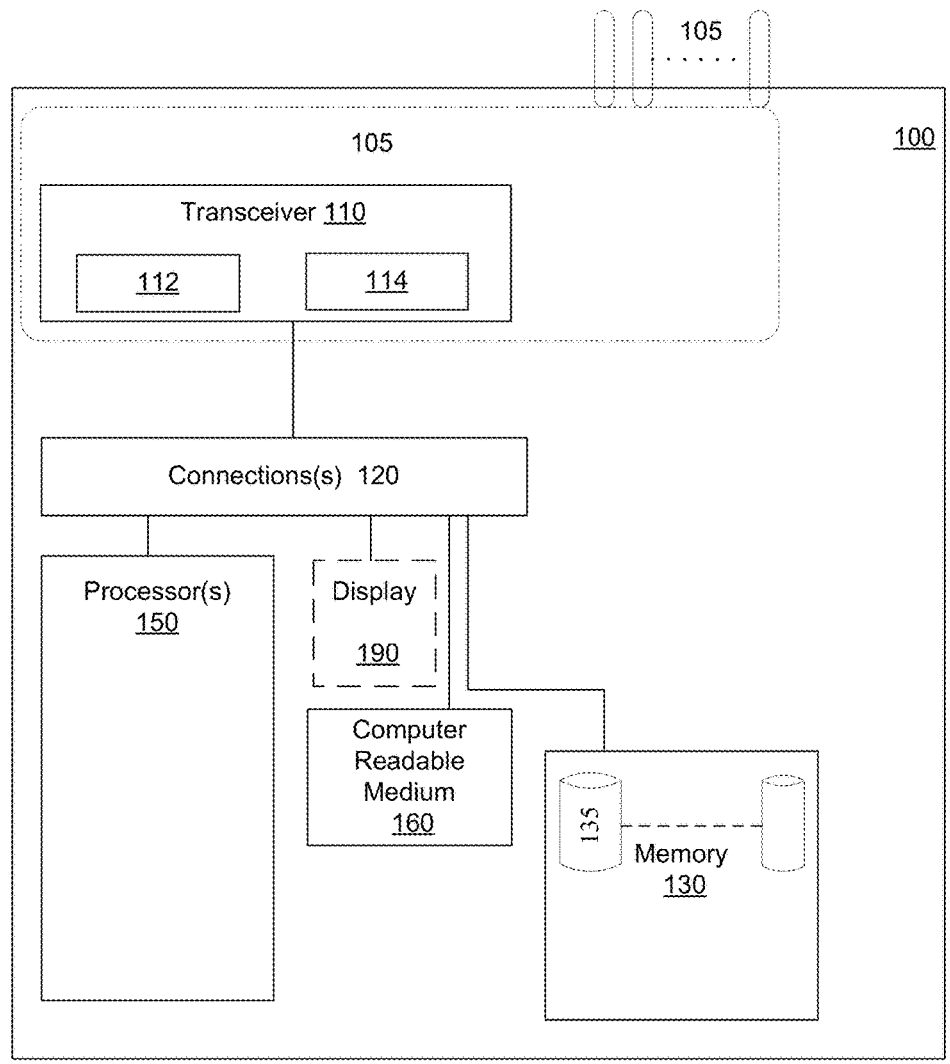
FIG. 1 shows a schematic block diagram illustrating certain exemplary features of a non-AP STA shown as UE 100 enabled to perform wireless communication including unicast, multicast, and/or broadcast, and wireless medium characterization in a wireless environment in accordance with certain embodiments presented herein.

Embodiments disclosed facilitate wireless communication between devices. In some embodiments, wireless communication is facilitated through the use of protocols or modifications to protocols that assist in channel calibration. In some embodiments, channel calibration may include performing measurements related to sounding, ranging, and/or direction finding. In some embodiments, disclosed techniques may be used in wireless environments to facilitate ranging and direction finding between devices. In a set of wirelessly networked devices, disclosed embodiments may facilitate ranging and/or direction finding between two devices (one-to-one) and/or multicast (from one-to-many) and/or broadcast (one to all) devices. The term "unicast" is used to indicate transmission of signals from a STA to a single device, whereas the term "multicast" is used to indicate transmission of signals from a STA to a plurality of devices. The term "broadcast" is used to refer to transmission of signals from a STA to all devices authorized to and/or capable of receiving the transmitted signal.

In modern wireless systems, multiple antennas at the transmitter and receiver may be used to implement multiple input/multiple output (MIMO). MIMO facilitates parallel delivery of multiple spatially multiplexed data signals, which are referred to as multiple spatial streams. Further, in multi-user MIMO (MU-MIMO), an AP may simultaneously transmit to multiple client UEs and beamforming may be used for directional signal transmission or reception. The term "multiple transmit chains" may refer to the use of multiple transmit and/or multiple receive antennas. A data stream may be divided into multiple data streams, which are termed "transmit chains." The transmit chains may be spatially multiplexed (e.g. sent through separate radio transmitters with distinct antennas). For example, each transmitter may include an antenna separated by a short distance from another antenna. Spatial multiplexing may facilitate operation of the transmitters on the same frequency. At the receiving end, spatial multiplexing help distinguish individual transmit chains. For example, each chain may exhibit different multipath and/or other radio characteristics. In some instances, the chains may be combined at the receiver to obtain the transmitted data stream.

In beamforming, elements in a phased array antenna are combined so that signals at some angles experience constructive interference, while others experience destructive interference. Beamforming can be used to achieve spatial selectivity at the transmitting and receiving ends. For example, in 802.11ac, an AP may use a Null Data Packet Announcement (NDPA), which may be immediately followed by a Null Data Packet (NDP) to determine how to direct a transmission. The NDP can be a physical layer (PHY) frame without data but with a known format and may be used to calibrate the channel. For example, the UE(s) (receivers) receiving the NDP may respond with a "beamforming matrix", which provides some information about the channel. The information can be used by an AP (transmitter) to focus subsequent transmissions.

However, while the beamforming matrix can include some channel related information, beamforming matrices may not conventionally include information about Angle of Arrival (AoA), Angle of Departure (AoD), Azimuth, Channel Frequency Response (CFR), Channel Impulse Response (CIR), Power Delay Profile (PDP), First Arrival Correction (FAC), and/or other channel calibration metrics between communicating STAs. Further, the above information cannot typically be derived from information contained in a conventional beamforming matrix. Therefore, additional ranging/sounding message exchanges are often used to obtain the above information thereby increasing system overhead, and latency, which may adversely affect system performance metrics. Further, some ranging protocols (e.g. FTM) may be power and bandwidth inefficient due to a large number of message exchanges used for positioning/channel calibration. Because each device may perform positioning/channel calibration independently, traffic load may be increased substantially when several devices perform positioning/channel calibration.

Some disclosed embodiments pertain to beamforming calibration techniques, which facilitate improved UE location determination and/or channel characterization. Further, disclosed embodiments also facilitate the use of multiple transmit chains. For example, some disclosed embodiments may exploit the Null Data Packet (NDP) frame structure to facilitate utilization of multiple transmit chains. In addition, disclosed embodiments provide techniques for exchange of information between two communicating STAs including one or more of: Angle of Arrival (AoA), Angle of Departure (AoD), Azimuth, Channel Frequency Response (CFR), Channel Impulse Response (CIR), Power Delay Profile (PDP), First Arrival Correction (FAC), and/or other channel calibration parameters/metrics, which are also referred to herein as "channel calibration parameters", "channel calibration metrics" or "channel characterization information".

In some embodiments, the above channel calibration parameters/metrics may be determined and exchanged between communicating STAs with fewer frame exchanges. For example, in some embodiments, one or more of: frame structure, and/or information elements in frames, and/or message exchange protocols may be leveraged to determine and/or exchange calibration parameters/metrics. Example embodiments are described further herein.

Disclosed techniques may also be used to facilitate location determination including determination of micro-locations. In some embodiments, the location determination may be based on one or more of the above channel calibration parameters. For example, disclosed techniques may be embodied in an application on a UE, which may direct a user to a shelf containing a desired product in a store. As other examples, disclosed techniques may be used in surveillance cameras and/or drone navigation. The example message flows, frame formats, and/or information elements described herein may be compatible, in some respects with specifications, diagrams, and guidelines found in some 802.11 standards.

The term "Angle of Arrival" (AoA) refers to a direction of propagation of a radio-frequency wave incident on an antenna array relative to orientation of the antenna array. As one example, AoA may be determined based on the Time Difference of Arrival (TDOA) or phase difference measurements of a radio wave received at individual elements of an antenna array. Conversely, the term "Angle of Departure" (AoD) refers to a direction of propagation of a radio-frequency wave transmitted from an antenna array relative to orientation of the antenna array. In some embodiments, AoA and AoD may determined by a STA based on signals exchanged with another STA. For example, a STA, such as a receiver, may resolve AoA and AoD based on signals exchanged with another STA.

Any suitable technique may be used to estimate AoA information of frames received by a responder device and/or to estimate AoD information for frames transmitted from a responder device. For at least some embodiments, the responder device may use a number of different antenna patterns when estimating the AoA information of frames received from the initiator device. More specifically, when the responder device includes a number N≥2 antennas, the responder device may selectively enable different combinations of the antennas and estimate the channel conditions for a corresponding number of different antenna patterns. Angular information may be obtained using various techniques including, but not limited to: correlation; maximum likelihood estimation; Multiple Signal Classification (MUSIC) techniques, including variants such as Root-MUSIC, Cyclic MUSIC, or Smooth MUSIC; Estimation of Signal Parameters using Rotational Invariance Techniques (ESPRIT); Matrix Pencil, etc.

The term CFR for an $i^{th}$ transmitting (Tx) antenna and a $j^{th}$ receiving (Rx) antenna is also denoted by $H_{ij}(k)$ for a tone k. The term CIR denoted by $h_{ij}[n]$ refers to the inverse Fast Fourier Transform of the CFR, for the $i^{th}$ Tx antenna and a $j^{th}$ Rx antenna. In some embodiments, information exchanged between two communicating STAs may include a subset of information in the CIR (CIR'), which may capture the first arrival information. The length of CIR' may be function of the accuracy of the estimation of first arrival information. The term Channel Feedback Information (CFI) is used herein to refer to CFR, or CIR, or CIR' or PDP or FAC. For example, a Compressed Beamforming (CBF) frame or another frame may include a CFI field. The CFI field may include one or more of Channel Frequency Response (CFR) information, or Channel Impulse Response (CIR) information, or a subset of the CIR information with first arrival information, or Power Delay Profile (PDP) information, or First Arrival Correction (FAC) information. The PDP is a measure of signal intensity received through a multipath channel as a function of time delay. FAC time information facilitates greater accuracy in the timing of communications between two STAs, which may improve quality in positioning applications.

In MU-MIMO, the term "downlink" refers to communication, which may occur in parallel, from an AP to one or more UEs (transmitted by the AP), while the term "uplink" refers to communication, which may occur simultaneously, from one or more UEs to an AP (received by the AP).

Disclosed techniques may also be used to facilitate location determination including determination of micro-locations. For example, disclosed techniques may be embodied in an application on a UE, which may direct a user to a shelf containing a desired product in a store. As other examples, disclosed techniques may be used in surveillance cameras and/or drone navigation.

The term station or "STA" may refer to a device with a Medium Access Control (MAC) identifier coupled to a wireless network. A STA may be viewed as a logical entity that is a singly addressable instance of a medium access control (MAC) and physical layer (PHY) interface to a wireless medium. A STA may take the form of a non-AP STA, which refers to UE, including devices such as a mobile station, cellular phone, or a computing device such as a wearable device, laptop, handheld, tablet etc, or another entity coupled to the wireless network. A STA may also take the form of an Access Point STA (AP STA), which refers to APs that provide wireless connectivity to one or more non-AP STAs. An AP STA may be in communication with one or more non-AP devices and/or with other AP STAs. In some instances, in the description below, a STA may also be referred to as an "initiator" or as a "responder" for ease of explanation to distinguish from a STA that initiates a sequence of events from a STA that responds to the initiated sequence. A "STA" may function as both an "initiator" and a "responder". STAs may be mobile or stationary.

A STA may also take the form of "user equipment" (UE) or "mobile station" such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term UE is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. In some instances, UEs may also serve as APs for other devices.

In the figures below, like numbered entities in different figures may correspond to one another. Different instances of a common type of entity may be indicated by appending an additional label to the label for the common entity. For example, different instances of a UE 100 may be labeled 100-1, 100-2 etc. When referring to a common entity without an extra appended label (e.g. UE 100), any instance of the common entity can be applicable. Further, in the description below, the terms UE and AP are sometimes used instead of, or in addition to STA to facilitate description and for explanatory purposes only. Labels that may be assigned to UEs and/or APs are also merely for explanatory purposes. Functions attributed to a UE or STA below may also performed by a STA.

FIG. 1 shows a schematic block diagram illustrating certain exemplary features of a non-AP STA shown as UE 100 enabled to perform wireless communication including unicast, broadcast, and wireless medium characterization in a MU-MIMO environment in accordance with certain embodiments presented herein. In some embodiments, UE100 may take the form of a wearable user device, such as a wristwatch, spectacles etc., where one or more functional components of UE100 may be physically separate but operationally coupled to other functional components. For example, display 190 may be physically separate but operationally coupled processor(s) 150 and/or other functional units in UE100.

UE100 may, for example, include one or more processing units or processor(s) 150 and memory 130. UE100 may also include a wireless network interface 105. In some embodiments, wireless network interface may include transmitter 112 and receiver 114. In some embodiments, UE100 may further comprise computer-readable medium 160 and display 190. The components above may be operatively coupled to each other with one or more connections 120 (e.g., buses, lines, fibers, links, etc.). In certain example implementations, all or part of UE100 may take the form of a chipset, and/or the like. Further, UE100 may optionally include a screen or display 190 capable of rendering images of various types.

In some embodiments, processor(s) 150 may also receive input from transceiver 110, which may receive wireless signals through one or more antennas 105 which may be used for signal transmission and reception using MIMO/MU-MIMO. Transceiver 110 may, for example, include a transmitter 112 enabled to transmit one or more wireless signals over one or more types of wireless communication networks and a receiver 114 to receive one or more signals transmitted over one or more types of wireless communication networks. For example, transceiver 110 may be capable of communication with a Wireless Local Area Network (WLAN), which may be based on IEEE 802.11 standards, Wireless Personal Area Network (WPAN), which may be based on IEEE 802.15 standards and/or a Wide Area Network (WAN) based on one or more cellular communication standards.

Processor(s) 150 may be implemented using a combination of hardware, firmware, and software. In some embodiments, processor(s) 150 may perform position determination and/or location assistance functions based on information derived from wireless measurements by UE100 either independently, and/or in conjunction with received data or measurements from other STAs. In some embodiments, processor(s) 150, may include transceiver 110, and/or other components as part of a single chip, integrated circuit, or package.

Processor(s) 150 may use some or all of the received signals and/or information to determine channel characterization information including Time Difference of Arrival (TDOA), Round Trip Time (RTT), Received Signal Strength Indication (RSSI), CFR, CIR, PDP, FAC, etc. At locations where wireless signals are available, position determination may be performed based, in part, on the channel characterization information and/or a variety of techniques described herein. For example, techniques including RTT measurements, TDOA, Reference Signal Time Difference (RSTD), Advanced Forward Link Trilateralation (AFLT), hybrid techniques, Received Signal Strength Indicator (RSSI) based measurements, and/or some combination of the above may be used for position determination.

As one example, processor(s) 150 may determine, record, and/or receive: timestamps associated with a time of reception/arrival (TOA) and/or transmission/departure (TOD) of signals, which may be used to determine RTT and/or a distance between UE100 and one or more other devices. Further, AoA, AoD, and other characteristics and parameters described herein may be used to determine or estimate a location/micro-location of devices communicating with UE100. In some embodiments, the measurements and/or results obtained from measurements may be included in one or more frames exchanged between two STAs, such as between UE 100 and another device in accordance with one or more protocols described herein.

The elements and methodologies described herein may be implemented by various means depending upon the application. For example, these elements and methodologies may be implemented in hardware, firmware, software, or any combination thereof. For example, for a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code, which may be stored in a non-transitory computer-readable medium 160 and/or memory 130, may be read and executed by processor(s) 150.

Memory may be implemented within processor(s) 150 or external to processor(s) 150. As used herein the term "memory" refers to any type of long term, short term, volatile, nonvolatile, or other memory and is not to be limited to any particular type of memory or number of memories, or type of media upon which memory is stored. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. If implemented in firmware and/or software, the functions may be stored as one or more instructions or program code on a computer-readable medium, such as medium 160 and/or secondary memory. Examples include computer-readable media encoded with computer programs and data associated with or used by the program.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For example, the computer-readable medium including program code stored thereon may include program code to support wireless communication including unicast, broadcast, and wireless medium/channel characterization in a MU-MIMO environment in accordance with certain embodiments presented herein. The program code may further support wireless channel characterization, including sounding, ranging and/or position determination. For example, the code may support one or more of AFLT/RTT/RSSI/RSTD/TDOA/AoA/AoD, and other location determination techniques and/or channel characterization.

In some embodiments, instructions and/or data may be provided over a communication channel. For example, a communication apparatus may include a transceiver 110, which may receive signals through receiver 114 indicative of instructions and data. The instructions and data may cause one or more processors to implement wireless communication and/or wireless channel characterization (e.g. in a MU-MIMO environment), including ranging and/or position determination. The received instructions and data may also cause one or more processors to implement functions outlined herein.

Figure 2:
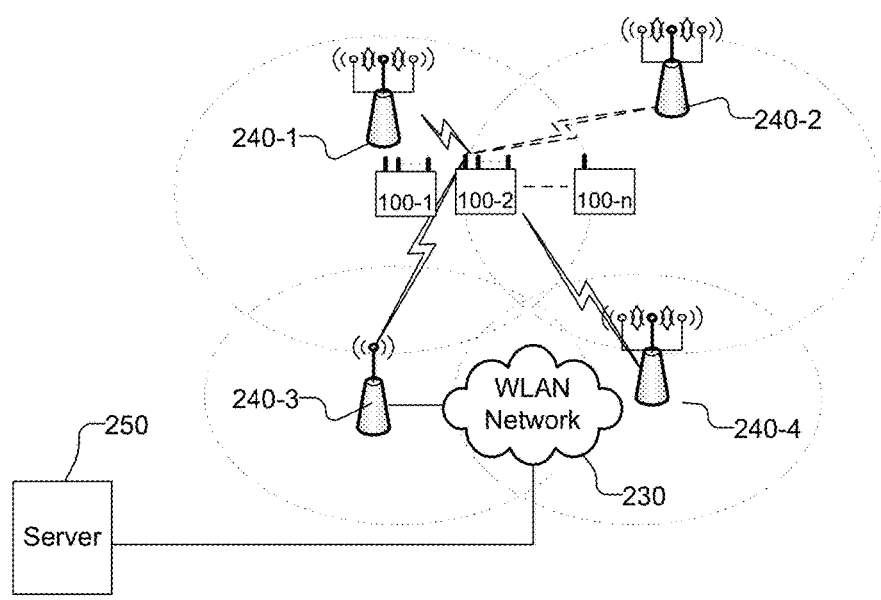
FIG. 2 shows a simplified architecture of a wireless communication system 200 in accordance with certain embodiments presented herein.

FIG. 2 shows a simplified architecture of a wireless communication system 200 in accordance with certain embodiments presented herein. System 200 may include non-AP STAs, which are shown in FIG. 2 as UEs 100-1 through 100-n (collectively referred to as UEs 100), and AP STAs such as APs 240-1 through 240-4 (collectively referred to as APs 240), which may communicate over WLAN 230. In some embodiments, UEs 100 and APs 240 may communicate with server 250 over WLAN 230. While system 200 illustrates a few UEs 100 and APs 240, the number of UEs 100 and APs 240 may be varied in accordance with various design parameters and may include a smaller or larger number of UEs 100 and/or APs 240. In some embodiments, one or more UEs 100 and/or APs 240 may comprise multiple antennas and may support MIMO, including MU-MIMO.

In some embodiments, UEs 100 and APs 240 may communicate over a WLAN network, which may be based on IEEE 802.11 or compatible standards. In some embodiments, UEs 100 and APs 240 may communicate using variants of the IEEE 802.11 standards. For example, UEs 100 and APs 240 may communicate using 802.11ac on the 5 GHz band, which may support MIMO, MU-MIMO and multiple spatial streams. In some embodiments, UEs 100 and APs 240 may communicate using some of the above standards, which may further support one or more of Very High Throughput (VHT) (as described in the above standards) and High Efficiency WLAN (HEW), and/or beamforming with standardized sounding and feedback mechanisms. In some embodiments, UEs 100 and/or APs 240 may additionally support legacy standards for communication with legacy devices.

In some embodiments, UEs 100 and/or APs 240 may be connected with one or more additional networks, such as a cellular carrier network, a satellite positioning network, WPAN access points, and the like (not shown in FIG. 2). In some embodiments, UEs 100 and/or APs 240 may be coupled to a wireless wide area network (WWAN) (not shown in FIG. 2). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax, and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available.

As illustrated in FIG. 2, UE100 may also communicate with server 250-1 through network 230 and APs 240, which may be associated with network 230. UE100 may receive and measure signals from APs 240, which may be used for position determination. In some embodiments, APs 240 may form part of a wireless communication network 230, which may be a wireless local area network (WLAN). For example, a WLAN may be an IEEE 802.11ax network.

Figure 3:
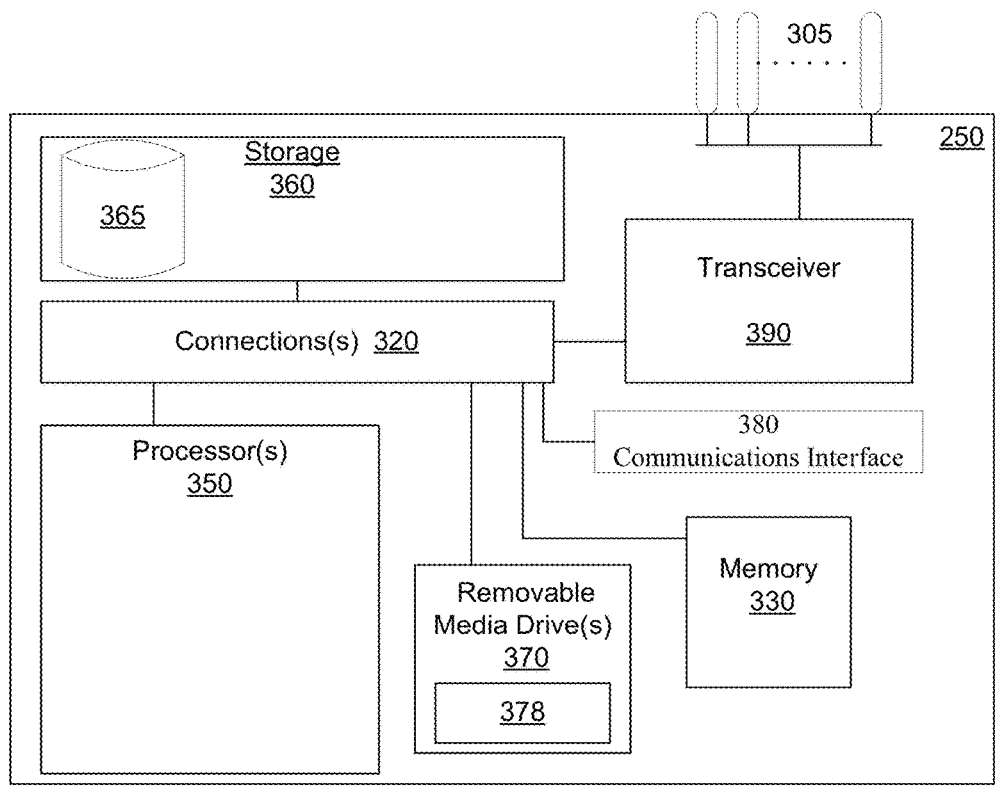
FIG. 3 shows schematic block diagram illustrating an AP STA shown as AP 240 enabled to perform wireless communication including unicast, multicast, and/or broadcast, and wireless medium characterization in a wireless environment in accordance with certain embodiments presented herein.

Reference is now made to FIG. 3, which is a schematic block diagram illustrating AP 240. In some embodiments, AP 240 may be enabled to perform wireless communication (including unicast, multicast, and broadcast) and wireless medium characterization. For example, the wireless communication and/or wireless medium characterization may be performed in a MU-MIMO environment in accordance with certain embodiments presented herein. In some embodiments, UE100 may serve as an AP 100.

In some embodiments, AP 240 may include, for example, one or more processor(s) 350, memory 330, coupled storage 360, and transceiver 390, which may be operatively coupled with one or more connections 320 (e.g., buses, lines, fibers, links, etc.). Transceiver 390 may be capable of communication with a Wireless Local Area Network (WLAN), which may be based on the IEEE 802.11 standard (or variants thereof), Wireless Personal Area Network (WPAN), which may be based on IEEE 802.15 and/or a Wide Area Network (WAN) based on one or more cellular communication standards. In some embodiments, transceiver 390 may be coupled to one or more antennas 305, which may be used for signal transmission and/or reception using MIMO/MU-MIMO.

In some embodiments, AP 240 may also interface with wired networks through communications interface 380 to obtain a variety of network configuration related information, such as service set identifiers (SSIDs), basic service set identification (BSSID), network identifiers and/or timing information. Processor(s) 350 may use some or all of the received information to generate CFI, TDOA, RTT, RSSI, CFR, CIR, PDP, Range, AOA, AOD, Azimuth, and other channel characterization information in accordance with certain with disclosed embodiments.

Processor(s) 350 may be implemented using a combination of hardware, firmware, and software, or any combination thereof. For a hardware implementation, the processing unit 950 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented using procedures, functions, and so on that perform the functions described herein.

Any machine-readable medium tangibly embodying instructions may be used in implementing the methodologies described herein. For example, software may be stored in removable media drive 370, which may support the use of non-transitory computer-readable media 378, including removable media. Program code may be resident on non-transitory computer readable media 378 and/or memory 330 and may be read and executed by processors 350. For example, the computer-readable medium including program code stored thereon may include program code to support wireless communication (including unicast, multicast, and broadcast), and/or wireless medium characterization (including in a MIMO/MU-MIMO) environment in accordance with certain embodiments presented herein. Memory 330 may be implemented within processors 350 or external to the processors 350.

In certain implementations, secondary memory may be operatively receptive of, or otherwise configurable to couple to a non-transitory computer-readable medium 378. As such, in certain example implementations, the methods and/or apparatuses presented herein may take the form in whole or part of a removable media drive 370 that may include non-transitory computer readable medium 378 with computer implementable instructions stored thereon, which if executed by at least one processing unit 350 may be operatively enabled to portions of the example operations including message flows and protocols described herein.

Figure 4A:
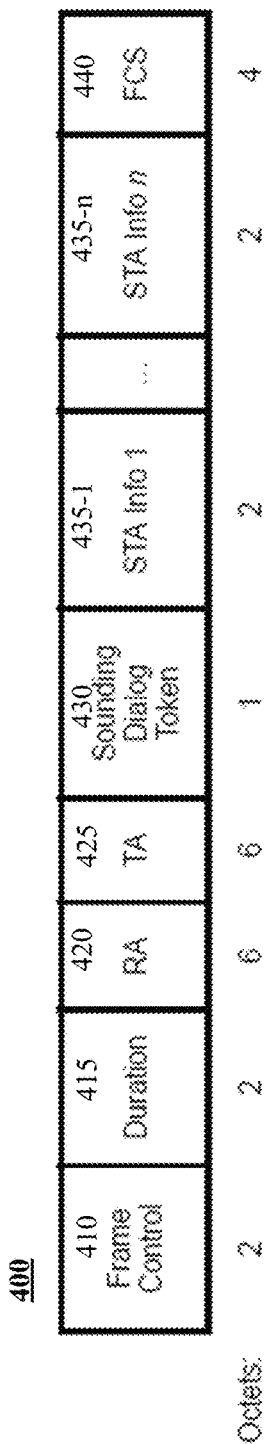
FIG. 4A shows an exemplary NDPA frame 400 with information pertaining to a subsequent NDP frame in accordance with certain embodiments presented herein.

FIG. 4A shows an exemplary NDPA frame 400 with information pertaining to a subsequent NDP frame in accordance with certain embodiments presented herein. In some embodiments, NDPA frame 400 may take the form of an 802.11ac NDPA frame as defined in "Part 11: Wireless LAN Medium Access Control (MAC) and Physical Layer (PHY) Specifications," IEEE P802.11-REVmc™/D5.0, January 2016, Draft Standard for Information technology—Telecommunications and information exchange between systems Local and metropolitan area networks—Specific requirements, (hereinafter "WLAN MAC & PHY Specifications") § 8.3.1.20, at 621-622, which is incorporated by reference in its entirety herein.

In some embodiments, NDPA frame may include Duration field 415, RA (Recipient Address) field 420, TA (Transmitter Address) field 425, Sounding Dialog token 430, STA Info field(s) 435-1 . . . 435-n, and FCS field 440. The NDPA frame contains at least one STA Info field. These fields are further described in the WLAN MAC & PHY Specifications document.

In some embodiments, when the NDP Announcement frame (e.g. VHT NDPA includes more than one STA Info field 435, the RA field 420 of the NDP Announcement frame can be set to the broadcast address. When the VHT NDP Announcement frame includes a single STA Info field 435, the RA field 420 of the VHT NDP Announcement frame can be set to the MAC address of the VHT beamformee. The TA field may, for example, be set to the address of a STA transmitting the VHT NDP Announcement frame.

Figure 4B:
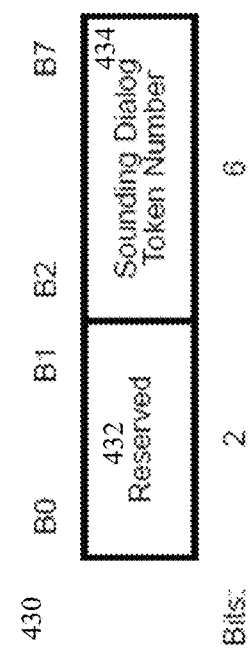
FIG. 4B shows the format of the Sounding Dialog Token field 430 including a Reserved subfield 432 with a 2-bit length and Sounding Dialog Token Number subfield 434 in accordance with certain embodiments presented herein.

The format of the Sounding Dialog Token field 430 is shown in FIG. 4B and includes Reserved subfield 432 with a 2-bit length and Sounding Dialog token number subfield 434. The Sounding Dialog Token Number subfield in the Sounding Dialog Token field contains a value selected by the AP (beamformer) to identify NDPA frame 400.

In some embodiments, a first bit in Reserved subfield 432 may be used by the initiator to indicate to the responder that the immediately subsequent NDP is to be used for ranging. In some embodiments, a second bit in the Reserved subfield 432 may be used to indicate symmetric ranging, to indicate that one side (e.g. the initiator) is willing to share information, such as ranging information (e.g. captured and/or determined by the initiator). In the example embodiments below, use of NDP frames for ranging and symmetric/asymmetric ranging may be indicated by appropriately configuring bits in Reserved subfield 432. In some embodiments, portions of other information elements in NDPA frame 400 may be used to indicate: (i) that a subsequent NDP frame is to be used for ranging; and/or (ii) that the initiator is willing to share ranging and/or other measured/determined channel characterization information.

In some embodiments, NDP frames, which may be transmitted from multiple antennas, may be leveraged to determine AoA, AoD, and other parameters. In some embodiments, the AoA, AoD and other determined information may be included in an FTM frame thereby facilitating location determination. In some embodiments, by determining AoA, AoD, and RTT, a device may be able to determine its 3D location based on an exchange of FTM frames with one other device with a known location thereby decreasing network traffic, lowering overhead, and/or facilitating quicker position determination. In the description below, a STA requesting a specific ranging/sounding or other operation may be termed an "Initiator" of the operation, while a STA responding to the ranging/sounding or other request may be termed a "Responder" of the operation.

FIGS. 5A and 5B show an example Fine Timing Measurement (FTM) frame 500, which may include AoA, AoD, and/or other information in accordance with certain embodiments presented herein. In some embodiments, FTM No Ack frame and FTM Ack frames may take the form of FTM frame 500 with appropriate values of bits or fields in FTM frame 500. Accordingly, FTM frame 500 may be used in conjunction with the FTM, Ack, FTM No Ack, and FTM Ack message sequences/exchanges described herein.

As shown in FIG. 5A, FTM frame 500 may include fields Category 502, Public Action 504, Dialog Token 506, Follow Up Dialog Token 508, Time of Departure (TOD) 510, Time of Arrival (TOA) 512, TOD Error 514, TOA Error 516. FTM frame 500 may optionally include one or more of: FTM Synchronization Information 518, LCI Report 520 field, Location Civic Report field 522, and Fine Timing Measurement parameters field 524, which may be of variable length. The above fields are defined in the WLAN MAC & PHY Specifications.

Public Action 504 differentiates various Public Action frame formats. provides a mechanism for specifying various extended management actions. A value of 32 indicates an FTM Request, while a value of 33 indicates an FTM frame. Category 502 may specify a category of Public Action 504. For example, a Category value of 21 may indicate VHT. Dialog Token 506 may be a nonzero value chosen by a responding STA to identify an FTM No Ack/FTM frame as the first of a pair, with a second or follow-up FTM frame to be sent later. The Dialog Token field may be set to 0 to indicate the end of the FTM session.

The second or follow-up FTM frame of the pair may use the nonzero value of Dialog Token 506 in the last transmitted FTM frame in Follow Up Dialog Token 508 to indicate that: (i) the current (second) FTM/FTM Ack frame (of the pair) is a follow up FTM, and, (ii) TOD 510, TOA 512, TOD Error 514, and TOA Error 518 fields contain the values associated with timestamps captured with the first FTM/FTM No Ack frame of the pair. Follow Up Dialog Token 508 may be set to 0 to indicate that: (i) the current FTM/FTM No Ack frame is not a follow up; and (ii) TOD 510, TOA 512, TOD Error 514, and TOA Error 518 fields are reserved. TOD and TOA fields may be expressed in units of picoseconds.

In some embodiments, TOD 510 may include a timestamp that represents the time, with respect to a time base, at which the start of the preamble of the last transmitted FTM No Ack/FTM frame appeared at a transmit antenna connector of a transmitting STA.

In some embodiments, TOA 512 field may include a timestamp that represents the time, with respect to a time base, at which the start of the preamble of an FTM Ack/Ack frame to the last transmitted FTM No Ack/FTM frame arrived at the receive antenna connector of a receiving STA.

In some embodiments, FTM Synchronization Information 518 is present in the initial FTM frame and in any retransmissions.

FIG. 5B shows the format of example AoA field 530, while FIG. 5C shows the format of example AoD field 540 according to certain embodiments disclosed herein. In some embodiments, AoA field 530 may include Element ID 532, Length 534, and AoA information 548. Similarly, in some embodiments, AoD field may include Element ID 542, Length 544, AoD information 548. In some implementations, the AoA Information may store values for Theta_AoA and Phi_AoA, as described below, in FIG. 5E to indicate angle of arrival information of a specified frame. In some implementations, the AoD field may store values for Theta_AoD and Phi_AoD to indicate angle of departure information of the specified frame.

In one embodiment, the TOD field 510 may include 6 bytes, the TOA field 512 may include 6 bytes, the AoA field (e.g. as a separate optional AoA field 530, or as part of FTM Parameters 524) may include 5 bytes, and the AoD field 613 (e.g. as a separate optional AoD field 540, or as part of FTM Parameters 524) may include 5 bytes (although for other embodiments, other field lengths may be used).

In some embodiments, AoA field 530 may include AoA information 538 for frames exchanged during a ranging operation, and the AoD field 540 may include AoD information 548 for frames exchanged during the ranging operation. For example, a responder may embed AoA information 538 into AoA field 530 (or another information element) serving as an AoA field of FTM frame 500, and may embed AoD information 548 of the FTM frame into AoD field 540 (or another information element serving as an AoD field of FTM frame 500). The responder device may also embed TOA information into the TOA field 512 of FTM frame 500, and may embed TOD information of into the TOD field 510 of FTM frame 500. The responder STA may then use the FTM frame 500 as an FTM No Ack frame ranging operations to transmit angle information (e.g., AoD and/or AoA) and time values to the initiator device. In some embodiments, in part, FTM No Ack frame may be compliant with existing standards/formats for FTM frames, thereby facilitating use of the frames in environments with a mix of legacy devices and devices that support the embedding, transmission and reception, of AoA, AoD, and other information in FTM (FTM No Ack) and/or FTM Ack frames.

In some embodiments, Element ID field 542 may store an element ID value indicating that AoA field 530 includes AoA information for a specified frame, while Length field 534 may store a value indicating a length (in bytes) of AoA field 530. In some embodiments, Element ID field 542 may store an element ID value indicating that AoD field 540 includes AoD information for a specified frame, while Length field 544 may store a value indicating a length (in bytes) of AoD field 540.

Figure 5D:
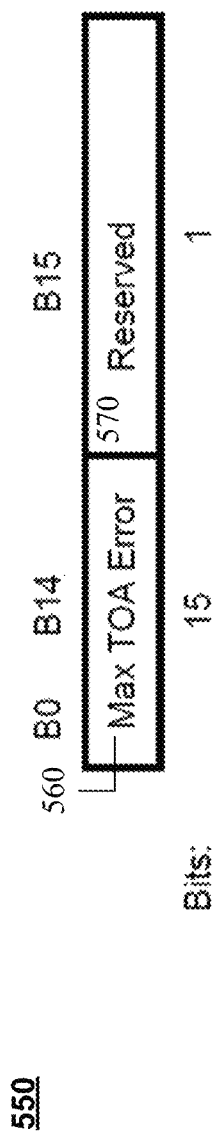
FIG. 5D shows a portion 550 of an example Fine Timing Measurement (FTM)/FTM No Ack frame 500 indicating that a response may be sent as an FTM Acknowledgement (FTM Ack) frame.

FIG. 5D shows a portion 550 of an example Fine Timing Measurement (FTM)/FTM No Ack frame 500 indicating that a response may be sent as an FTM Acknowledgement (FTM Ack) frame. In some embodiments, a reserved bit in the FTM/FTM No Ack frame 500 may be set to indicate to a responder that a response with an FTM Ack frame is desired. In some embodiments, bit B15 570 of the Max TOA Error Field 560 may be used to indicate to a responder that a response with an FTM Ack frame is desired. The reserved bit (e.g. bit B15 570 of the Max TOA Error Field 560) in an FTM No Ack frame 500, which is used to indicate to a responder that a response with an FTM Ack frame is desired, is also referred to as an acknowledgment response bit herein.

Figure 5E:
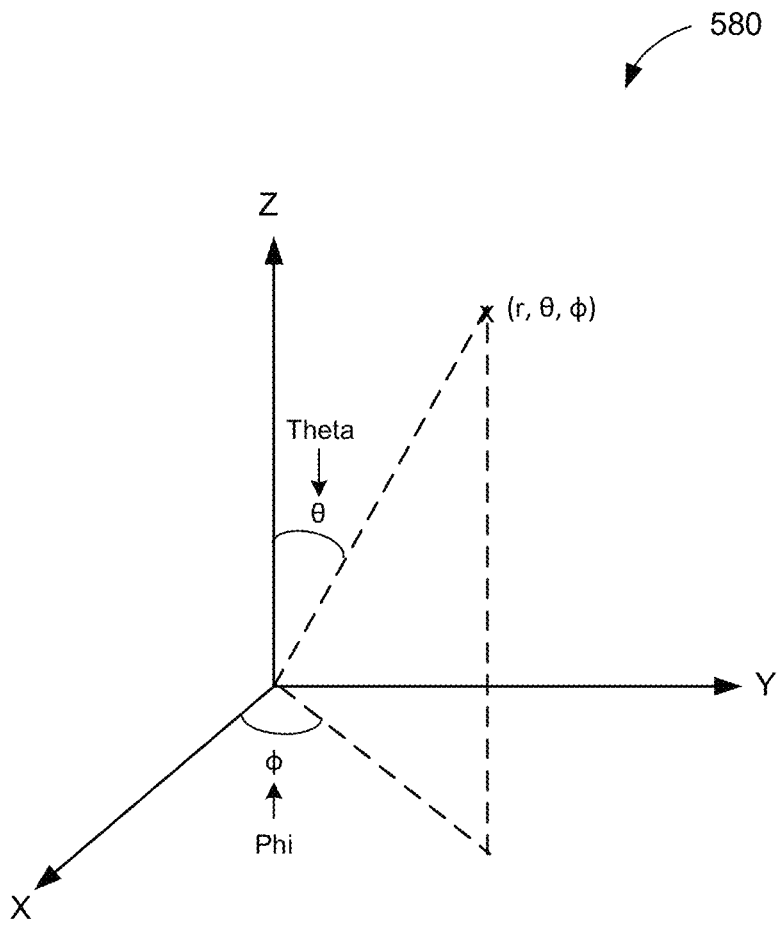
FIG. 5E is an example 3-dimensional coordinate system 580 for representing the position of a STA using a radius "r" and angles "theta" and "phi."

FIG. 5E is an example 3-dimensional coordinate system 580 for representing the position of a STA using a radius "r" and angles "theta" θ and "phi" φ. As depicted in FIG. 5A, φ may be an angle with respect to the horizontal (x-y) plane, while θ may be an angle with respect to the vertical (z) axis. φ may range from 0° to 360°, while θ may range from 0° to 180°. The radius r is the distance between the origin and a point coordinate (r, θ, and φ) representing the location of a wireless device relative to the origin. In some implementations, the AoA field may store values for θ_AoA and φ_AoA to indicate angle of arrival information of a specified frame. In some implementations, the AoD field may store values for θ_AoD and φ_AoD to indicate angle of departure information of the specified frame.

Thus, disclosed embodiments include the use of FTM frame 500, which, in some embodiments, may take the form of a conventional FTM frame. In some embodiments, FTM frame 500 may include AoA, AoD and other information. For example, FTM Measurement parameter 524, additional optional AOA and/or AoD fields, may comprise AoA, AoD, and/or other parameters. In some embodiments, FTM Measurement Parameters 524 may be used to carry information pertaining to AoA, AoD, and/or other parameters. FTM frame 500 is also referred to herein as an FTM No Ack frame/

In some embodiments, separate optional AoA and/or AoD fields may be provided in FTM frame 500. The AoA and/or AoD fields may carry AoA and/or AoD information. FTM frame 500 may include other bits, fields etc to indicate when FTM frame 500 includes additional information. In some embodiments, the AoA, AoD, FTM Ack and other information may be included in a manner so that legacy devices may continue to function normally. For example, in some embodiments, where the responder device may be an access point STA, the responder device may embed, into a beacon or other frame, information indicating whether the responder device is capable of including AoA and/or AoD information in one or more frames exchanged between the initiator device and the responder device. In some aspects, this information may be embedded within an information element (IE) or a vendor-specific information element (VSIE) of the beacon frame or other frame.

Further, in some embodiments, FTM frame 500 may (alternatively or additionally) take the form of an FTM No Ack or FTM Ack frame. For example, as shown in FIG. 5C, a reserved bit or acknowledgment response bit in the FTM No Ack frame 500 may be set to indicate to a responder that a response with an FTM Ack frame is desired.

In some embodiments, the first 12 bits of the AoA information field 538 may be used to indicate a value for θ_AoA, and the second 12 bits of the AoA information field may be used to indicate a value for φ_AoA. Similarly, the first 12 bits of the AoD information field 548 may be used to indicate a value for θ_AoD, and the second 12 bits of the AoD information field 548 may be used to indicate a value for φ_AoD. In embodiments, where 12-bit values are used, the 12-bit values for θ_AoA and θ_AoD may provide a resolution of approximately 0.044° (180° divided by (212−1)), while the 12-bit values for φ_AoA and φ_AoD may provide a resolution of approximately 0.088° (360° divided by (212−1)).

FTM frames formatted according to current FTM protocols (e.g., as defined by the IEEE 802.11REVmc standards) include a 6-byte TOD field 510 and a 6-byte TOA field 512 to store TOD and TOA information, respectively—e.g. to embed timestamp values $t_{1\_TOD}$ and $t_{2\_TOA}$, where $t_{1\_TOD}$ is the time of departure of a first frame, and $t_{2\_TOA}$ is the time of arrival of a corresponding response frame, where the first frame and corresponding response frame are used to measure RTT. In some embodiments, because RTT may be determined using a single time difference value ($t_{2\_TOA} - t_{1\_TOD}$) rather than two individual timestamp values (e.g., one of the TOD 510 or TOA 512) fields may be repurposed to store AoA and AoD information, thereby eliminating the need for an FTM frame to include a separate field that stores AoA and AoD information (and thus reducing the size of the FTM frame). For example, as indicated above, RTT may be determined as ($t_{2\_TOA} - t_{1\_TOD}$), where $t_{1\_TOD}$ is the time of departure of a first frame, and $t_{2\_TOA}$ is the time of arrival of a corresponding response/acknowledgment frame, where the first frame and corresponding response frame are used for ranging, including measuring RTT.

Figure 6:
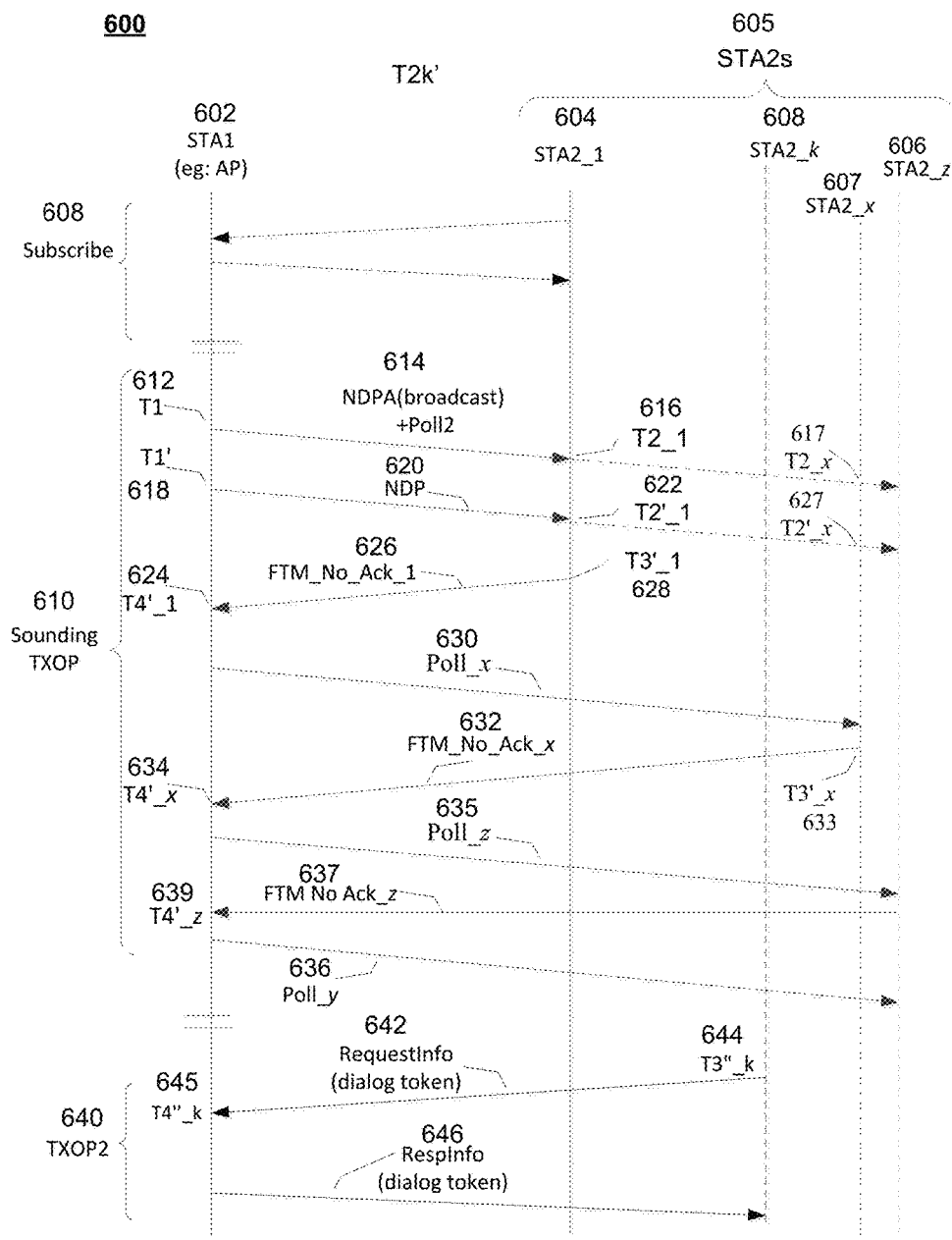
FIG. 6 shows an exemplary message flow 600 for location determination. In some embodiments, message flow 600 may occur between a first STA1 602 (e.g. an AP) and a plurality of other STAs, shown as STA2 604 . . . STA_k . . . STAz 606, where 2≤k≤z.

FIG. 6 shows an exemplary message flow 600 between a first STA STA1 602 and one or more second STAs STA2 605. In some embodiments, message flow 600 may be used for location determination and/or channel characterization. For example, parameters related to a communication channel between first STA1 602 and one or more second STA2s 605 may be measured and/or determined using message flow 600. In some embodiments, message flow 600 may occur between a first STA1 602 (e.g. an AP) and a one or more second STAs STA2s 605, which are shown as STA2_1 604 . . . STA2_k 608 . . . STA2_x 607 . . . STA2_z 606, where 1≤k≤z and 1≤x≤z.

In some embodiments, one or more of STA2s 605 may use subscription message flow 608 (and/or a subscription protocol 608) to subscribe to be polled by first STA1 602. In some embodiments, the polling may be related to location determination, and/or FTM, and/or for other channel characterization purposes. Accordingly, in some embodiments, STA1 602 may be configured (e.g. through subscription and/or another mechanism) with subscription or polling list that includes one or more of STA2s 605. In some embodiments, the polling list in STA1 602 may specify an order to poll one or more subscribing STA2s 605 that form a subscription group relative to STA1 602. For example, STA2_1 604 and STA2_z 606 may form part of a subscription group. In one embodiment, STA2_1 604 and STA2_z 606 may subscribe to be polled by an AP (e.g. STA1 602) for ranging, location determination, channel characterization, and/or computation offloading.

In some embodiments, STA1 602 may poll one or more subscribing STA2s 605 in one or more Transmission Opportunities (TXOPs). A TXOP enables a STA to transmit multiple frames consecutively in a burst after acquisition of a communication channel.

In some embodiments, STA1 602 may perform ranging with a group of one or more subscribing STA2s 605 in a single TXOP thereby limiting overhead. For example, Sounding TXOP 610 may be used to perform ranging with STA2_1 604, STA2_z 606 and any other subscribing STA2s. In some embodiments, STA1 602 may group one or more subscribing STA2s 605 by a delivery traffic indication map (DTIM) or using Target Wake Times (TWTs) etc. thereby decreasing the overhead per unit time imposed by ranging.

In some embodiments, at time T1 612, STA 1 602 may broadcast an NDPA frame 614. In some embodiments, NDPA frame 614 may indicate that STA2_1 604 is being polled. NDPA frames may identify one or more STA2s 705 to listen to a subsequent NDP frame. NDPA frames may also include information about the subsequent NDP frame, including the size of the NDP frame, which may depend on the number of antennas and spatial streams used by the transmitting STA (e.g. STA1 602).

NDPA frame 614 may be received by STA2_1 604 at time T2_1 616, and by other STA2s at various respective local reception times. The time T1 612 of transmission of NDPA frame 614 may be recorded by STA1 602. The times of reception T2_x of NDPA frame 614 may be recorded by respective receiving STA2_x 607 (1≤x≤z). For example, for x=1, STA2_1 604 may record the time of reception T2_1 616 of NDPA frame 614.

At time T1' 618, following the broadcast of NDPA frame 614, STA 1 602 may broadcast an NDP frame 620. The time of transmission T1' 618 of NDP frame 620 may be recorded by STA1 602.

As shown in FIG. 6, NDP frame 620 may be received by STA2_1 604 at time T2'_1 622. The time In general, NDP frame 620 may be received by stations STA2_x 607 at respective local reception times T2'_x 627. The times of reception T2'_x 627 of NDP frame 620 may be recorded by respective receiving STA2_x 607 (1≤x≤z). For example, for x=1, STA2_1 604 may record the time of reception T2'_1 622 of NDP frame 620.

In some embodiments, NDPA frame 614 and/or NDP frame 620 may be broadcast by STA1 602 using multiple antennas. In some embodiments, one or more non-subscribing STA2s 605, (e.g. some non-subscribing STA2_k 608) may be able to leverage a broadcast NDP for independent one-sided computation of location and/or determination of other channel calibration metrics. In some embodiments, STA2s 705 receiving the NDP frame 720 may compute channel characterization metrics including Angle of Arrival (AoA) and/or Angle of Departure (AoD) following reception of the NDP. Computation of AoA/AoD are one-sided computations and may be performed locally at each STA2 705 receiving NDP frame 620.

At time T3'_1 628, following the reception of NDP frame 620, STA2_1 604 may transmit FTM No Ack_1 frame 626. FTM No Ack_1 frame 626 may be received by STA 1 602 at time T4'_1 624. The time T3'_1 628 of transmission of FTM No Ack_1 frame 626 may be recorded by STA2_1 604. The time of reception T4'_1 624 of FTM No Ack_1 frame 626 at STA1 602 may be recorded by STA1 602. FTM No Ack_1 frame 626 may include information pertaining to one or more times T2_1 616 (reception of NDPA frame 614 at STA2_1 604), T2' 622 (reception of NDP frame 620 at STA2_1 604), and/or T3'_1 628 (time of transmission of FTM No Ack_1 frame 626 by STA2_1 604).

In some embodiments, as outlined above, FTM No Ack_1 frame 626 (and/or FTM No Ack_x frame, 1≤x≤z) may be an FTM frame, which may include CFI and/or AoA and/or AoD, and/or other channel characterization information, as measured by STA2 604. In some embodiments, FTM No Ack_1 frame 626 (and/or FTM No Ack_x frame 632) may further have acknowledgment response bit set to indicate to STA1 602 that a conventional "Ack" frame response to FTM No Ack_1 frame 626 (and/or FTM No Ack_x frame 632) is not desired or requested. On receiving FTM No Ack_1 frame 626 with channel characterization information related to the communication channel between STA1 602 and STA2_1 604, STA 1 602 may have sufficient information to perform channel characterization including ranging and/or determining a location of STA2_1 604.

In some embodiments, in the same sounding TXOP 610, STA1 602 may unicast, multicast, or broadcast Poll_x frame 630. Poll_x frame 630 may include an indication that some subscribing STA2_x is being polled, where 2≤x≤z. In some embodiments, Poll_x frame 630 may include channel characterization information, including the range and/or AoA and/or AoD information of the immediately preceding polled STA2_(x-1). For example, for x=2, Poll_(x=2) frame may include channel characterization information for STA2_(x-1)=STA2_1 604 as measured or determined by STA1 602.

In some embodiments, when Poll_x frame 630 is broadcast or multicast, information pertaining to STA2_(x-1), which may be included in Poll_x frame 630 may be rendered inaccessible or unintelligible to some other STA2s 605 that may receive Poll_x frame 630. For example, encryption and/or other privacy/security mechanisms may be used to prevent unauthorized access to information intended for some specific STA2_(x-1).

In some embodiments, STA2_x may respond to Poll_x frame 630 with FTM No Ack_x frame 632 at time T3'_x 633, which may include channel characterization information for the communication channel between STA1 602 and STA2_x 607. In some embodiments, FTM No Ack_x frame 632 may have acknowledgment response bit set. FTM No Ack_x frame 632 may be received by STA1 602 at time T4'_x 634. The time of reception of FTM No Ack_1 frame 634 may be recorded by STA1 602. As outlined above, FTM No Ack_x frame 634 may include timing information such as reception times of NDPA frame 614, NDP frame 620 at STA2_x 607, as well as CFI and/or AoA and/or AoD, as measured/determined by STA2_x 607. On receiving FTM No Ack_x frame 632 STA1 602 may have sufficient information to perform ranging and/or determine a location for STA_x 607.

In some embodiments Poll_x 630 and FTM No Ack_x 632 sequence may continue for a plurality of APs in the subscription group, where x may be appropriately incremented if there are other subscribing STA2s. In some embodiments, Poll_x 630 and FTM No Ack_x 632 sequence may iterate until subscribing STA2s have been polled. For example, in FIG. 6, the sequence may continue until STA1 602 transmits Poll_z frame 635 to STA2_z 606 at time T4'_z 639 and STA2_z 606 responds with FTM No Ack_z frame 637, which may include timing information such as reception times of NDPA frame 614, NDP frame 620 at STA2_z 606, as well as CFI and/or AoA and/or AoD, as measured/determined by STA2_z 606.

In some embodiments, a "dummy" Poll_y frame 636 may be used to indicate the end of sounding TXOP 610. In some embodiments, Poll_y frame may be used to indicate the end of a Poll_x 630 and FTM No Ack_x 632 sequence and/or TXOP 610. In some embodiments, Poll_y frame 636 may additionally or alternatively include information determined by STA1 602 from an immediately preceding FTM No Ack frame received prior to transmission of Poll_y frame 636. For example, if the immediately preceding FTM No Ack frame prior to termination of TXOP 610 was FTM No Ack_z frame 637 transmitted by STA2_z 606, then, Poll_y frame 636 may include channel characterization information pertaining to STA2_z 606 measured/determined from FTM No Ack_z frame 637. In general, STA1 602 may compute AoA/AoD and/or channel characterization information based on an immediately preceding FTM No Ack_(x-1)/FTM No Ack_z frame received from a subscribing STA2_(x-1)/STA2_z 606 and share this via the next Poll_x 630/Poll_y 636 frame transmitted by STA1 602 during the same TXOP (e.g. TXOP 610).

In some embodiments, alternatively or additionally, STA2_1 604 and/or STA_z 606 (and/or another STA2) may separately contend for new TXOP2 640 and request STA1 602 for last measured/determined channel characterization information from a corresponding FTM No Ack_1 frame 626 and/or FTM No Ack_z frame 637, respectively. As one example, STA2_1 604 may contend for TXOP2 640 and request information measured from and/or determined based on frame 626. As another example, STA_z 606 may contend for TXOP2 640 and request information measured from and/or determined based on FTM No Ack_z frame 637. For simplicity and ease of description, only one TXOP2 640 is shown in FIG. 6. However, in general, message flow 600 may include multiple TXOPs following sounding TXOP 610.

In some embodiments, the NDPA frame 614 may specify a dialog token for the transaction, which may be referenced by STA2_x 607 (1≤x≤z,) when requesting a new TXOP2 640 using RequestInfo frame 642 transmitted at time T3" 644. In some embodiments, STA1 602 may respond to RequestInfo frame 642 using RespInfo frame 646 to send measured/determined information from corresponding FTM No Ack_x 632 frame to requesting STA2_x 607. RespInfo frame 646 may also include the dialog token referenced in corresponding RequestInfo frame 642. STA2_x 607 may record the time of transmission T3"_x of RequestInfo frame 642 by STA2_x 607. STA1 601 may record the time of reception T4"_x of RequestInfo frame 642 at STA1 602.

In some embodiments, one or more unassociated/unaffiliated STA2s 605 (such as some STA2_k 608) which may not be subscribed to a STA1 602 subscription group may be able to leverage new TXOP2 640 using the RequestInfo frame 642. For example, STA2_k 608 may use RequestInfo frame 642 to request measured/determined channel characterization information. In some embodiments, legacy STA2s, which may not support sounding protocol 610 may also leverage TXOP2 640 to obtain measurements and/or complete a message exchange with STA1 602.

In some embodiments, RequestInfo frame 642 transmitted by an unaffiliated and/or legacy STA2_k 608 during TXOP2 640 with the dialog token may be received by STA1 602 at time T4" 645. The time of transmission T3"_k 644 of RequestInfo frame 642 may be recorded by STA2_k 608. In some embodiments, RequestInfo frame 642 may include a time T2'_k at which NDP frame 620 may have been received. The time of reception T4"_k 645 of RequestInfo frame 642 may be recorded by STA1 602. In some embodiments, STA1 602 may respond to STA2_k 608 and RequestInfo frame 642 with RespInfo frame 646. RespInfo frame 646 may include the time of reception T4"_k 645 of RequestInfo frame 642 In some embodiments, RespInfo frame 646 may also include the dialog token referenced in RequestInfo frame 642.

In some embodiments, upon completion of the message exchanges both STA1 602 and one or more STA2s 605 may have information sufficient for ranging and/or location determination.

Figure 7:
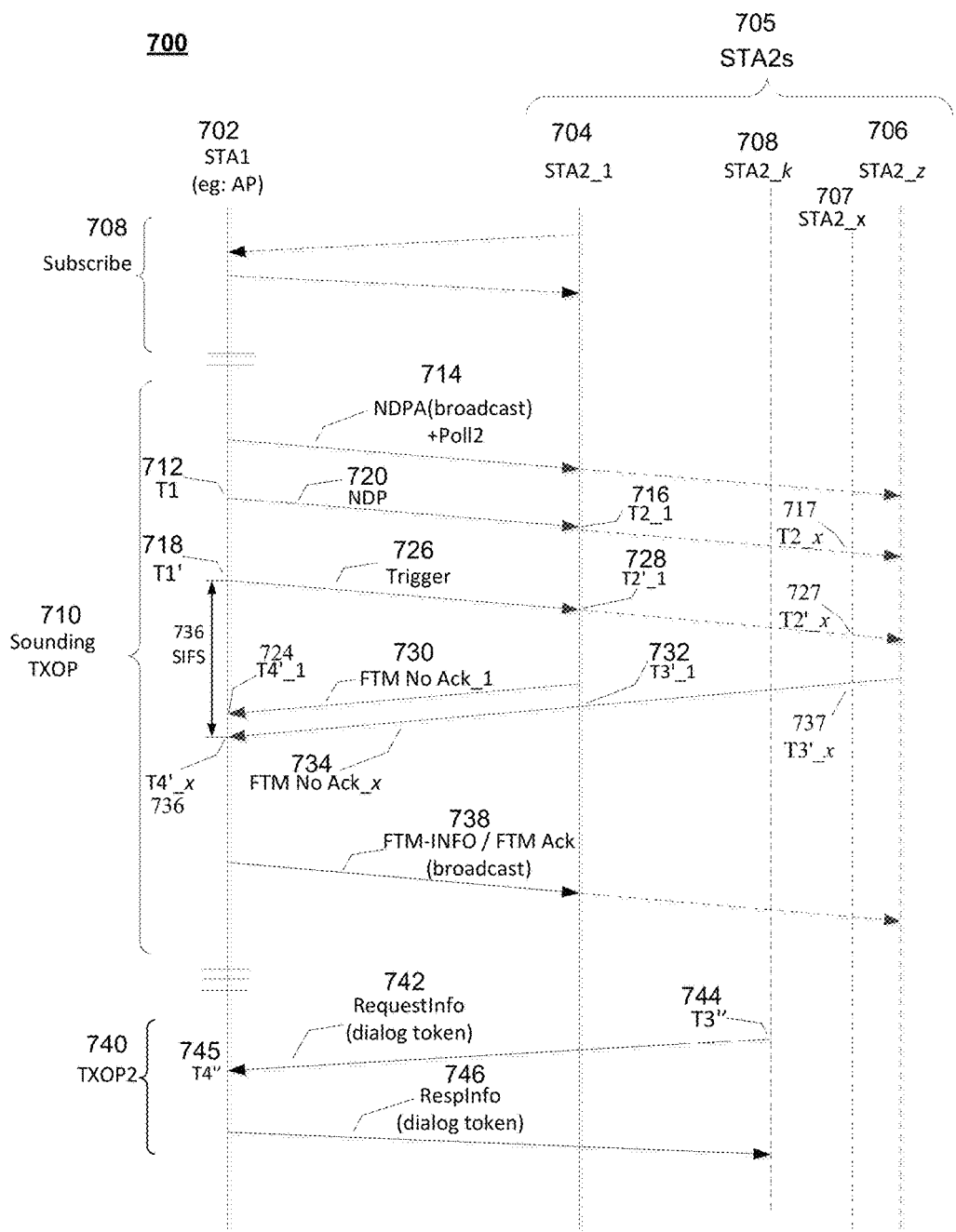
FIG. 7 shows an exemplary message flow 700 to facilitate location determination between a first STA1 702 (e.g. an AP) and a plurality of other STAs, shown as STA2 704 . . . STA_k . . . STAx 707 . . . STAz 706, where 2≤k≤z in a WLAN environment supporting uplink multiuser capabilities such as Uplink MU-MIMO.

FIG. 7 shows an exemplary message flow 700 to facilitate location determination between a first STA1 702 (e.g. an AP) and a plurality of other STAs, shown as STA2 704 ... STA_k ... STAx 707 ... STAz 706, where 2≤k≤z in a WLAN environment supporting uplink multiuser capabilities such as Uplink MU-MIMO. In some embodiments, message flow 700 may be used for location determination and/or channel characterization. For example, parameters related to a communication channel between first STA1702 and one or more second STA2s 705 may be measured and/or determined. In some embodiments, message flow 700 may occur between a first STA1702 (e.g. an AP) and one or more other second STA2s 705, which are shown as STA2_1 704 ... STA2_k708 ... STA2_x 707 ... STA2_z 706, where 1≤k≤z and 1≤x≤z. In some embodiments, message flow 700 may use Orthogonal Frequency Division Multiple Access (OFDMA) or uplink multi-user MIMO (UL MU-MIMO) for message exchanges.

In some embodiments, one or more of STA2s 705 may use subscription message flow 708 (and/or a subscription protocol 708) to subscribe to be polled by first STA1 702. Accordingly, in some embodiments, STA1 702 may be configured (e.g. through a subscription protocol and/or another mechanism) with a subscription or polling list including one or more of STA2s 705. For example, STA2_1 704 and STA2_z 706 may form part of a subscription group. In one embodiment, STA2_1 704 and STA2_z 706 may subscribe to be polled by an STA1 702, which may be an AP STA, for ranging, location determination, channel characterization, and/or computation offloading.

Subscribing STA2s 705 may be polled in a single TXOP, or in multiple TXOPs. In some embodiments, STA1 702 may perform ranging with a group of STAs in a single TXOP thereby limiting overhead. For example. Sounding TXOP 710 may be used to perform ranging with STA2_1 704, STA2_z 706 and other STAs. In some embodiments, STA1 may group STAs by DTIM and/or TWTs etc. thereby decreasing the overhead per unit time imposed by ranging.

In some embodiments, STA1 702 may broadcast NDPA frame 714. In some embodiments, NDPA frame 714 may indicate that one or more subscribed STA2s 705 and/or a group of STA2s are being polled. The time of transmission of NDPA frame 714 may be recorded by STA1 702. The times of reception of NDPA frame 714 may be recorded by the respective receiving STA2s 705.

At time T1 712, following the broadcast of NDPA frame 714, STA 1 702 may broadcast NDP frame 720. The time of transmission T1 712 of NDP frame 720 may be recorded by STA1 702. NDP frame 720 may be received by STA 2_1 704 a time T2_1 716. In general, NDP frame 720 may be received by stations STA2_x 707 at respective local reception times T2_x 717, where 1≤x≤z. The times of reception of NDP frame 720 may be recorded by respective receiving stations STA2_x 707. For example, for x=1, STA2_1 704 may record the time of reception T2_1 716 of NDPA frame 714. In some embodiments, NDPA frame 614 and/or NDP frame 620 may be broadcast by STA1 602 using multiple antennas.

In some embodiments, STA2s 705 receiving the NDP frame 720 may compute channel characterization metrics including Angle of Arrival (AoA) and/or Angle of Departure (AoD) following reception of the NDP. Computation of AoA/AoD are one-sided computations and may be performed locally at each STA2 705 receiving NDP frame 620. In some embodiments, non subscribing STAs may be able to leverage a broadcast NDP for independent one-sided computation of location/channel characterization metrics (e.g.: AoA).

At time T1' 718, following the transmission of NDP frame 720, STA 1 602 may broadcast trigger frame 726. The time of transmission T1' 718 of trigger frame 726 may be recorded by STA1 702. Trigger frame 726 may be received by STA2_1 704 at time T2'_1 728. In some embodiments, STA2_x 707 receiving trigger frame 726 may determine T2'_x on receiving trigger frame 726. In general, trigger frame 726 may be received by stations STA2_x 707 at respective local reception times T2'_x 727, where 1≤x≤z. In some embodiments, STA2_x 707 receiving trigger frame 726 may determine T2'_x on receiving trigger frame 726. The times of reception of trigger frame 726 may be recorded by respective receiving stations STA2_x 707. For example, for x=1, STA2_1 704 may record the time of reception T2'_1 728 of trigger frame 726.

In some embodiments, at time T3'_1 after a Short Inter Frame Spacing (SIFS) time interval following the end of transmission of trigger frame 726, STA2_1 704 may transmit FTM No Ack_1 frame 730, which may be received by STA1 702 at time T4'_1. 724. FTM No Ack_1 frame 730 may include channel characterization information for the communication channel between STA1 602 and STA2_1 704. In some embodiments, FTM No Ack_1 frame 730 may have acknowledgment response bit set.

The SIFS interval, is a range of time duration values for which are provided by relevant IEEE 802.11 standards. The SIFS interval may, for example, specify a time to transition from a receive mode (e.g., to receive a request or other frame) to a transmit mode (e.g., to transmit an acknowledgment or other frame) or vice versa.

In general, FTM No Ack_x frame 734 may be transmitted from STA_x 707 at a time T3'_x after a SIFS time interval following the end of reception (at STA2_x 707) of trigger frame 726. The times of transmission T3'_x 737 of the FTM No Ack frame by respective stations STA2_x 707 may be recorded by STA2_x 707. FTM No Ack_x frame 734 may include channel characterization information for the communication channel between STA1 602 and STA2_x 707. In some embodiments, FTM No Ack_x frame 734 may have acknowledgment response bit set.

The time of reception T4'_x 736 (at STA1 702) of a respective FTM No Ack_x frame 734 from an STA2_x 707 may be recorded by STA1 704. For example, for x=1, at STA1 702, the time of reception T4'_1 724 of FTM-ACK_1 frame 730 from STA2_1 704 may be recorded.

In some embodiments, the FTM No_Ack_x frames 734 (1≤x≤z) may be multiplexed using Orthogonal Frequency Division Multiple Access (OFDMA) or uplink multi-user MIMO (UL MU-MIMO). In some embodiments, STA1 702 may receive FTM No Ack frames from all responding STA2s 705 either: (a) simultaneously, or (b) within a SIFS interval from the end of transmission of trigger frame 726, or (c) in close temporal proximity (i.e. by some designated or requested time) and/or (d) within some time interval of transmission of trigger frame 726. Upon receiving the FTM-ACK frames, STA1 602 may have timing information to perform ranging, location determination, and/or channel characterization.

In some embodiments, upon completion of ranging, and within the same sounding TXOP 710, STA1 may broadcast or multicast FTM-INFO or FTM Ack frame 738. In some embodiments, FTM-INFO or FTM Ack frame 738 may include timing, ranging and/or channel characterization measurements for all responding STA2s 705 that may be part of a subscription group. In some embodiments, FTM-INFO/FTM Ack frame 738 may include measurements for one or more STA2s in a subscription group. In some embodiments, when FTM-INFO/FTM Ack frame 738 is broadcast or multicast, information pertaining to one or more STA2s may be rendered inaccessible or unintelligible to other STAs that may receive FTM-INFO frame 738 but are not authorized to receive the information. For example, encryption and/or other privacy/security mechanisms may be used to prevent unauthorized access to information intended for a first STA by a second STA.

In some embodiments, alternatively or additionally, STA2_$k$708 (and/or another STA2_$x$ 707) may separately contend for a new TXOP2 740 and request STA1 702 for measured/determined channel characterization information. In some embodiments, the measured/determined channel characterization information may be requested using RequestInfo frame 742. RequestInfo frame 742 may be transmitted STA2_$k$708 (and/or another STA2_$x$ 707) at time T3" 744. Time T3" 744 may be recorded by STA2_$k$708.

In some embodiments, STA2_$k$708 may be one of STA2s 705 that may not be part of the subscription list on STA1 602 and/or a legacy STA2 that may not support the protocol outlined in sounding TXOP 710. STA1 702 may record the time of reception T4"745 of RequestInfo frame 742. In some embodiments, RequestInfo frame 742 may include time T2'_k at which NDP frame 720 may have been received by STA2_$k$708.

In some embodiments, the NDPA frame 714 may specify a dialog token for the transaction, which may be referenced by STA2_$x$ 707 or STA2_$k$708 when requesting a new TXOP2 740 using RequestInfo frame 742. For example, a subscribing STA2_$x$ 707 (1≤x≤z) may contend for TXOP2 740 and request information measured from and/or determined based on FTM No Ack_x frame 734 using RequestInfo frame 742, which may include a dialog token specified in NDPA frame 714. As a further example, a subscribing STA2_$x$ 707 may contend for TXOP2 740 and request information measured by STA1 702 in relation to RequestInfo frame 742 transmitted by STA2_$x$ 707.

In some embodiments, STA1 702 may respond to RequestInfo frame 742 in TXOP2 740 using RespInfo frame 746, which may also include the dialog token referenced in corresponding RequestInfo frame 742. In some embodiments, RespInfo frame 746 may include measured/determined information related to a corresponding RequestInfo frame 742 such as the time of reception T4" 745 of corresponding RequestInfo frame 742 and/or other channel characterization information measured/determined by STA1 702. For example, RespInfo frame 746 may include time T4" 745 and/or other measured/determined information related to a corresponding RequestInfo frame 742 for an unaffiliated/legacy STA2_$k$708 or another STA2_$x$ 707.

As another example, RespInfo frame 746 may include measured/determined information related to FTM No Ack_x 734, which may have been requested by STA2_$x$ 704 using a RequestInfo frame 742 that referenced a dialog token. In some embodiments, RespInfo frame 746 may also include the dialog token referenced in a corresponding RequestInfo frame 742. In some embodiments, legacy STA2s, which may not support sounding protocol 610 may also leverage TXOP2 640 to obtain measurements and/or complete a message exchange with STA1 602 using the RequestInfo 742 and RespInfo 746 message sequence in TXOP2 740.

In some embodiments, upon completion of the message exchanges both STA1 702 and one or more STA2s 705 may have information sufficient for ranging and/or location determination.

Figure 8:
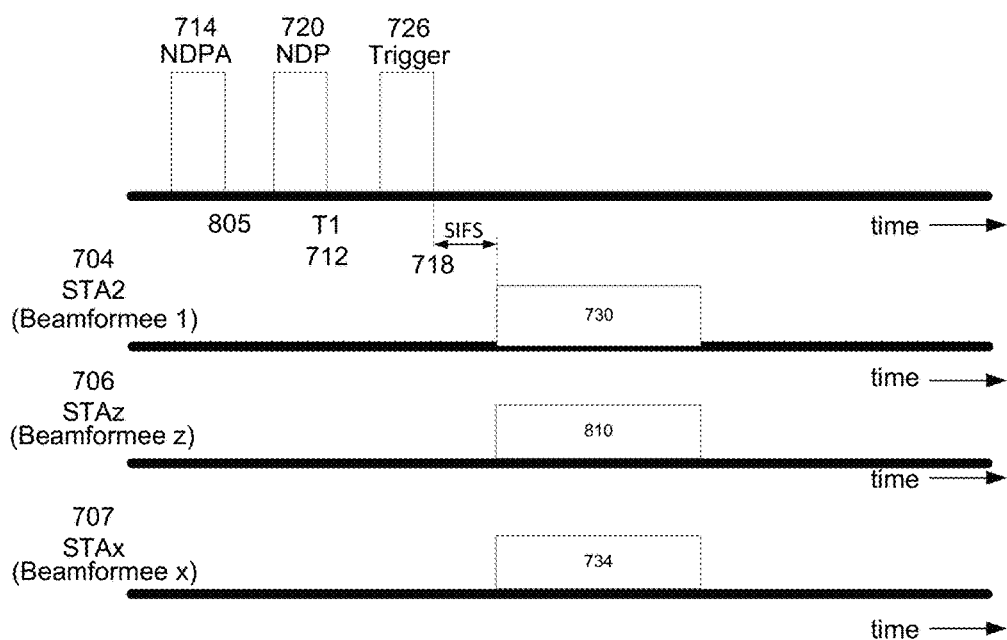
FIG. 8 shows a timeline 800 of events associated with the message flow sequence in FIG. 7.

FIG. 8 shows a timeline 800 of events associated with the message flow sequence in FIG. 7. As shown in FIG. 8, at time 805 NDPA frame 714 may be broadcast at time 805, followed by broadcast of NDP frame 720 at time T1' 712. Trigger frame is broadcast at time T1' 718 and a following a SIFS time interval after reception of trigger frame 726, STA2 704 (beamformee 1), STAz 706 (beamformee 706), and STAx 707 (beamformee x) send out FTM-ACK frames 730, 810, and 734, respectively.

In some embodiments, STA1,STA2,STAx or some subset of the STAs may be additionally be APs or other wall powered devices that may periodically perform message exchanges, such as those outlined above in relation to FIGS. 6-8, to facilitate passive positioning/channel characterization by other STAs in the vicinity to determine their respective locations.

Figure 9:
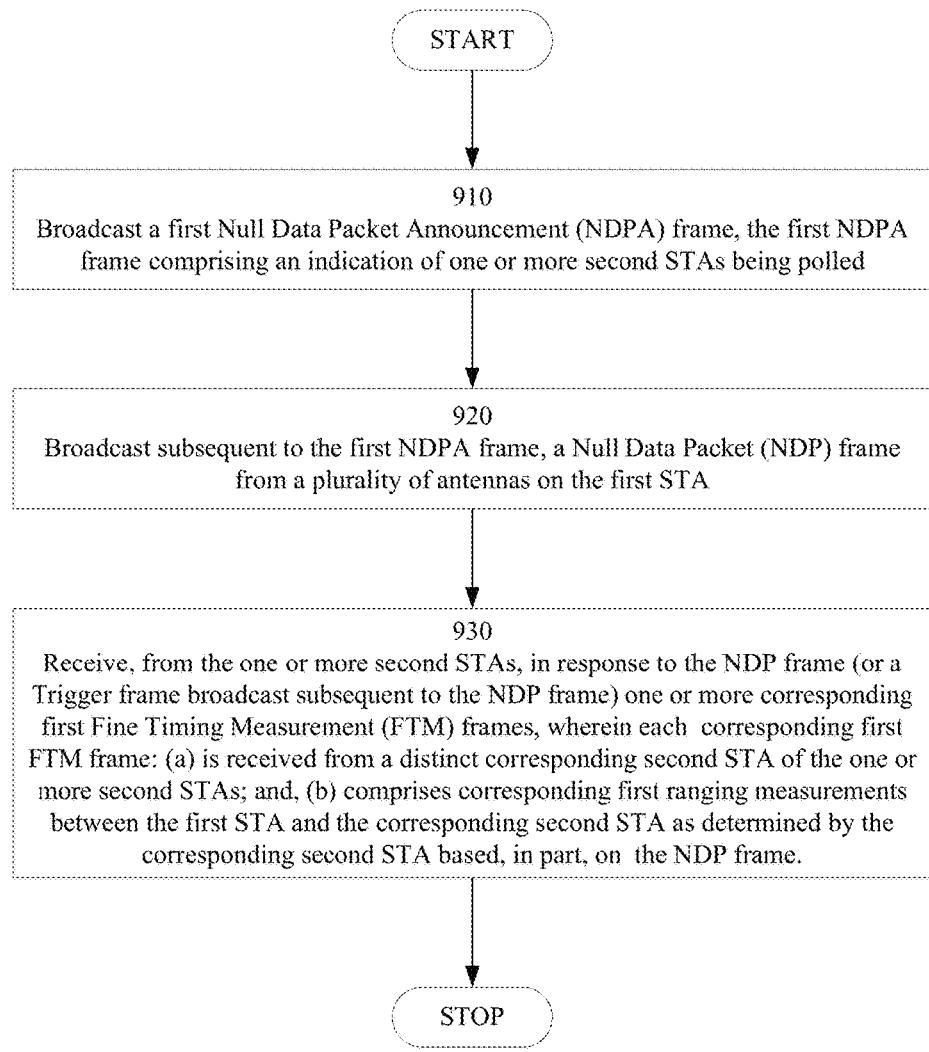
FIG. 9 shows an exemplary flowchart 900 of a method for ranging and/or location determination according to disclosed embodiments.

FIG. 9 shows an exemplary flowchart 900 of a method for ranging, and/or direction finding, and/or location determination according to disclosed embodiments. In some embodiments, method 900 may be performed by an STA (e.g. STA 602 or STA 702). In some embodiments, the STA may take the form of AP STA (e.g. AP 240), or a non-AP STA (e.g. UE 100). In some embodiments, method 900 may be embodied as instructions on a computer-readable medium, which may be executed by a processor coupled to STA.

In some embodiments, in block 910, a first Null Data Packet Announcement (NDPA) frame may be broadcast by a first STA (STA1), the first NDPA frame comprising an indication of one or more second STAs (STA2-$j$) being polled, where 1≤j≤N and N≥1.

In block 920, the first STA STA1 may broadcast, subsequent to the first NDPA frame, a Null Data Packet (NDP) frame from a plurality of antennas on the first STA STA1.

In block 930, the first STA STA1 may receive, in response to the NDP frame, or a Trigger frame broadcast subsequent to the NDP frame, one or more corresponding first Fine Timing Measurement (FTM) frames FTM-k from the one or more second STAs STA2-$j$, where 1≤k≤j. In some embodiments, each corresponding first FTM frame FTM-k: (a) may be received from a distinct corresponding second STA STA2-$k$ of the one or more second STAs STA2-$j$; and, (b) may comprise corresponding first ranging measurements between the first STA STA1 and the corresponding second STA STA2-$k$ as determined by the corresponding second STA STA2-$k$ based, in part, on the NDP frame.

In some embodiments, the first STA STA1 and the one or more second STAs STA2-$j$ may form part of a subscription group. In some embodiments, each corresponding first ranging measurement comprise at least one of: Angle of Arrival (AoA) information of wireless signals from the first STA STA1 at the corresponding second STA STA2-$k$; or Angle of Departure information for the corresponding first FTM frame at the corresponding second STA STA2-$k$; or a time of arrival of the NDP frame at the corresponding second STA STA2-$k$; or a time of arrival of a trigger frame at the corresponding second STA STA2-$k$, the trigger frame being broadcast by the first STA STA1 subsequent to the NDP frame; or a time of departure of the corresponding first FTM frame FTM-k.

In some embodiments, the one or more corresponding first FTM frames FTM-k may be received (e.g. in block 930) in response to a previously transmitted trigger frame, and encoded using Orthogonal Frequency Division Multiple Access, (OFDMA). In some embodiments, the trigger frame may be broadcast by the first STA STA1 to the one or more second STA2-*j* subsequent to the broadcast of the NDP frame. In some embodiments, the one or more corresponding first FTM frames FTM-k may be received within a Short Inter Frame Spacing (SIFS) time interval from the end of transmission of the trigger frame.

In some embodiments, a set of second ranging measurements may be determined based, in part, on the one or more corresponding first FTM frames FTM-k received by the first STA STA1; and the first STA STA1 may broadcast, in response to the one or more corresponding first FTM frames FTM-k, at least one additional frame. The at least one additional frame may comprise a subset of the second ranging measurements. In some embodiments, the communication above (including broadcast of the NDPA frame, broadcast of the NDP frame, reception of first FTM frames FTM-k, and broadcast of the at least one additional frame) may be performed during a single transmission opportunity (TxOP).

In some embodiments, the first STA STA1: may receive, at least one request for a subset of the second ranging measurements, the request referencing a dialog token associated with the NDP frame; and may transmit a response to the at least one request comprising the requested subset of ranging measurements, wherein the response references the dialog token. In some embodiments, the at least one request for the subset of second ranging measurements may be received subsequent to the TxOP above during which the communication occurs.

In some embodiments, receiving the one or more corresponding first Fine Timing Measurement (FTM) frames FTM-k (e.g. in block 930) may comprise: receiving an initial corresponding first FTM frame FTM-1 (k=1) from a corresponding initial STA STA2-1 (k=1) in the one or more second STAs STA2-*k*; transmitting, upon reception of the initial corresponding first FTM frame FTM-1, one or more poll frames Poll_k, each of the one or more poll frames identifying a distinct subsequent second STA STA2-*k*, in the one or more second STAs STA2-*k*, k≥2; and receiving, in response to each poll frame Poll_k, a corresponding subsequent first FTM frame FTM-k, k≥2.

In some embodiments, each of the one or more poll frames Poll_k, k≥2, may further comprise: a corresponding second ranging measurement based, in part, on an immediately preceding corresponding first FTM frame FTM-(k−1) received by the first STA STA$_1$100-1 prior to transmission of the poll frame Poll_k. In some embodiments, the communication above (including broadcast of the NDPA frame, broadcast of the NDP frame, reception of one or more first FTM frames FTM-k, and transmission of poll frames Poll_k) may be performed during a single transmission opportunity (TxOP).

In some embodiments, a set of second ranging measurements may be determined based, in part, on the one or more corresponding first FTM frames FTM-k received by the first STA STA$_1$100-1. Further, at least one request for a subset of the second ranging measurements may be received by the first STA STA$_1$100-1, where the request references a dialog token associated with the NDP frame; and in response to the at least one request, the first STA STA$_1$100-1 may transmit the requested subset of ranging measurements, wherein the response references the dialog token.

Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A method on a first station (STA) comprising:
   broadcasting a first Null Data Packet Announcement (NDPA) frame, the first NDPA frame comprising an indication of one or more second STAs being polled;
   broadcasting, subsequent to the first NDPA frame, a Null Data Packet (NDP) frame from a plurality of antennas on the first STA; and
   receiving, from the one or more second STAs, in response to the NDP frame, one or more corresponding first Fine Timing Measurement (FTM) frames, wherein each corresponding first FTM frame:
   is received from a distinct corresponding second STA of the one or more second STAs, and,
   comprises corresponding first ranging measurements between the first STA and the corresponding second STA as determined by the corresponding second STA based, in part, on the NDP frame.

2. The method of claim 1, wherein, the one or more corresponding first FTM frames are:
   received in response to a previously transmitted trigger frame, and
   encoded using Orthogonal Frequency Division Multiple Access, (OFDMA), and the method comprises:
   broadcasting the trigger frame to the one or more second STAs, the trigger frame being broadcast subsequent to the broadcast of the NDP frame.

3. The method of claim 2, wherein the one or more corresponding first FTM frames are received within a Short Inter Frame Spacing (SIFS) time interval from the end of transmission of the trigger frame.

4. The method of claim 2, further comprising:
   determining, a set of second ranging measurements based, in part, on the one or more corresponding first FTM frames received by the first STA; and
   broadcasting, in response to the one or more corresponding first FTM frames, at least one additional frame, the at least one additional frame comprising a subset of the second ranging measurements.

5. The method of claim 4, wherein communication between the first STA and the one or more second STAs occurs during a single transmission opportunity.

6. The method of claim 4, further comprising:
   receiving, at least one request for a subset of the second ranging measurements, the request referencing a dialog token associated with the NDP frame; and
   transmitting a response to the at least one request comprising the requested subset of ranging measurements, wherein the response references the dialog token.

7. The method of claim 1, wherein receiving the one or more corresponding first FTM frames comprises:
   receiving an initial corresponding first FTM frame from a corresponding initial STA in the one or more second STAs;
   transmitting, upon reception of the initial corresponding first FTM frame, one or more poll frames, each of the one or more poll frames identifying a distinct subsequent STA in the one or more second STAs; and
   receiving, in response to each poll frame, a corresponding subsequent first FTM frame.

8. The method of claim 7, wherein each of the one or more poll frames further comprises:

a second ranging measurement based, in part, on an immediately preceding corresponding first FTM frame received by the first STA prior to transmission of the poll frame.

9. The method of claim 7, wherein communication between the first STA and the one or more second STAs occurs during a single transmission opportunity.

10. The method of claim 7, further comprising:
determining, a set of second ranging measurements based, in part, on the one or more corresponding first FTM frames received by the first STA;
receiving, at least one request for a subset of the second ranging measurements, the request referencing a dialog token associated with the NDP frame; and
transmitting, in response to the at least one request, the requested subset of ranging measurements, wherein the response references the dialog token.

11. The method of claim 1, wherein the first STA and the one or more second STAs form part of a subscription group.

12. The method of claim 1, wherein each corresponding first ranging measurement comprises at least one of:
Angle of Arrival (AoA) information of wireless signals from the first STA at the corresponding second STA; or
Angle of Departure information for the corresponding first FTM frame at the corresponding second STA; or
a time of arrival of the NDP frame at the corresponding second STA; or
a time of arrival of a trigger frame at the corresponding second STA, the trigger frame being broadcast by the first STA subsequent to the NDP frame; or
a time of departure of the corresponding first FTM frame.

13. A first STA comprising:
a processor coupled to a memory and a plurality of antennas, wherein the processor is configured to:
broadcast a first Null Data Packet Announcement (NDPA) frame, the first NDPA frame comprising an indication of one or more second STAs being polled;
broadcast, subsequent to the first NDPA frame, a Null Data Packet (NDP) frame from the plurality of antennas; and
receive, from the one or more second STAs, in response to the NDP frame, one or more corresponding first Fine Timing Measurement (FTM) frames, wherein each corresponding first FTM frame:
is received from a distinct corresponding second STA of the one or more second STAs, and,
comprises corresponding first ranging measurements between the first STA and the corresponding second STA as determined by the corresponding second STA based, in part, on the NDP frame.

14. The first STA of claim 13, wherein the one or more corresponding first FTM frames are:
received in response to a previously transmitted trigger frame, and
encoded using Orthogonal Frequency Division Multiple Access, (OFDMA), and the processor is configured to:
broadcast the trigger frame to the one or more second STAs, the trigger frame being broadcast subsequent to the broadcast of the NDP frame.

15. The first STA of claim 14, wherein the one or more corresponding first FTM frames are received within a Short Inter Frame Spacing (SIFS) time interval from the end of transmission of the trigger frame.

16. The first STA of claim 14, wherein the processor is further configured to:

determine, a set of second ranging measurements based, in part, on the one or more corresponding first FTM frames received by the first STA; and
broadcast, in response to the one or more corresponding first FTM frames, at least one additional frame, the at least one additional frame comprising a subset of the second ranging measurements.

17. The first STA of claim 16, wherein communication between the first STA and the one or more second STAs occurs during a single transmission opportunity.

18. The first STA of claim 16, wherein the processor is further configured to:
receive, at least one request for a subset of the second ranging measurements, the request referencing a dialog token associated with the NDP frame; and
transmit a response to the at least one request comprising the requested subset of ranging measurements, wherein the response references the dialog token.

19. The first STA of claim 13, wherein to receive the one or more corresponding first FTM frames, the processor is configured to:
receive an initial corresponding first FTM frame from a corresponding initial STA in the one or more second STAs;
transmit, upon reception of the initial corresponding first FTM frame, one or more poll frames, each of the one or more poll frames identifying a distinct subsequent STA in the one or more second STAs; and
receive, in response to each poll frame, a corresponding subsequent first FTM frame.

20. The first STA of claim 19, wherein each of the one or more poll frames further comprises:
a second ranging measurement based, in part, on an immediately preceding corresponding first FTM frame received by the first STA prior to transmission of the poll frame.

21. The first STA of claim 19, wherein communication between the first STA and the one or more second STAs occurs during a single transmission opportunity.

22. The first STA of claim 19, wherein the processor is further configured to:
determine, a set of second ranging measurements based, in part, on the one or more corresponding first FTM frames received by the first STA;
receive, at least one request for a subset of the second ranging measurements, the request referencing a dialog token associated with the NDP frame; and
transmit, in response to the at least one request, the requested subset of ranging measurements, wherein the response references the dialog token.

23. The first STA of claim 13, wherein the first STA and the one or more second STAs form part of a subscription group.

24. The first STA of claim 13, wherein each corresponding first ranging measurement comprises at least one of:
Angle of Arrival (AoA) information of wireless signals from the first STA at the corresponding second STA; or
Angle of Departure information for the corresponding first FTM frame at the corresponding second STA; or
a time of arrival of the NDP frame at the corresponding second STA; or
a time of arrival of a trigger frame at the corresponding second STA, the trigger frame being broadcast by the first STA subsequent to the NDP frame; or
a time of departure of the corresponding first FTM frame.

25. A first station (STA) comprising:
  means for broadcasting a first Null Data Packet Announcement (NDPA) frame, the first NDPA frame comprising an indication of one or more second STAs being polled;
  means for broadcasting, subsequent to the first NDPA frame, a Null Data Packet (NDP) frame from a plurality of antennas on the first STA; and
  means for receiving, from the one or more second STAs, in response to the NDP frame, one or more corresponding first Fine Timing Measurement (FTM) frames, wherein each corresponding first FTM frame:
    is received from a distinct corresponding second STA of the one or more second STAs, and,
    comprises corresponding first ranging measurements between the first STA and the corresponding second STA as determined by the corresponding second STA based, in part, on the NDP frame.

26. The first STA of claim 25, wherein the one or more corresponding first FTM frames are:
  received in response to a previously transmitted trigger frame, and
  encoded using Orthogonal Frequency Division Multiple Access, (OFDMA), and the processor is configured to:
    broadcast the trigger frame to the one or more second STAs, the trigger frame being broadcast subsequent to the broadcast of the NDP frame.

27. The first STA of claim 25, wherein each corresponding first ranging measurement comprises at least one of:
  Angle of Arrival (AoA) information of wireless signals from the first STA at the corresponding second STA; or
  Angle of Departure information for the corresponding first FTM frame at the corresponding second STA; or
  a time of arrival of the NDP frame at the corresponding second STA; or
    a time of arrival of a trigger frame at the corresponding second STA, the trigger frame being broadcast by the first STA subsequent to the NDP frame; or
  a time of departure of the corresponding first FTM frame.

28. A non-transitory computer-readable medium comprising executable instructions to configure a processor to:
  broadcast a first Null Data Packet Announcement (NDPA) frame, the first NDPA frame comprising an indication of one or more second STAs being polled;
  broadcast, subsequent to the first NDPA frame, a Null Data Packet (NDP) frame from the plurality of antennas; and
  receive, from the one or more second STAs, in response to the NDP frame, one or more corresponding first Fine Timing Measurement (FTM) frames, wherein each corresponding first FTM frame:
    is received from a distinct corresponding second STA of the one or more second STAs, and,
    comprises corresponding first ranging measurements between the first STA and the corresponding second STA as determined by the corresponding second STA based, in part, on the NDP frame.

29. The non-transitory computer-readable medium of claim 28, wherein the one or more corresponding first FTM frames are:
  received in response to a previously transmitted trigger frame, and
  encoded using Orthogonal Frequency Division Multiple Access, (OFDMA), and the processor is configured to:
    broadcast the trigger frame to the one or more second STAs, the trigger frame being broadcast subsequent to the broadcast of the NDP frame.

30. The first STA of claim 28, wherein each corresponding first ranging measurement comprises at least one of:
  Angle of Arrival (AoA) information of wireless signals from the first STA at the corresponding second STA; or
  Angle of Departure information for the corresponding first FTM frame at the corresponding second STA; or
  a time of arrival of the NDP frame at the corresponding second STA; or
  a time of arrival of a trigger frame at the corresponding second STA, the trigger frame being broadcast by the first STA subsequent to the NDP frame; or
  a time of departure of the corresponding first FTM frame.

* * * * *